US008285578B2

(12) United States Patent
Sheppard

(10) Patent No.: US 8,285,578 B2
(45) Date of Patent: Oct. 9, 2012

(54) MANAGING INFORMATION TECHNOLOGY (IT) INFRASTRUCTURE OF AN ENTERPRISE USING A CENTRALIZED LOGISTICS AND MANAGEMENT (CLAM) TOOL

(75) Inventor: Robert F. Sheppard, Telford (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1923 days.

(21) Appl. No.: 10/763,072

(22) Filed: Jan. 21, 2004

(65) Prior Publication Data

US 2005/0159969 A1 Jul. 21, 2005

(51) Int. Cl.
*G06Q 10/00* (2012.01)
(52) U.S. Cl. .................. 705/7.13; 705/7.27; 705/7.36
(58) Field of Classification Search .............. 705/9, 7.13
See application file for complete search history.

(56) References Cited

U.S. PATENT DOCUMENTS

| | | | | |
|---|---|---|---|---|
| 6,336,101 | B1* | 1/2002 | Dean et al. | 705/29 |
| 6,442,557 | B1* | 8/2002 | Buteau et al. | 705/7.29 |
| 6,938,081 | B1* | 8/2005 | Mir | 709/223 |
| 6,947,989 | B2* | 9/2005 | Gullotta et al. | 709/226 |
| 6,985,955 | B2* | 1/2006 | Gullotta et al. | 709/229 |
| 7,409,463 | B2* | 8/2008 | Ramachandran | 709/246 |
| 2002/0069102 | A1* | 6/2002 | Vellante et al. | 705/10 |
| 2002/0129356 | A1* | 9/2002 | Hellerstein et al. | 717/177 |
| 2002/0147974 | A1* | 10/2002 | Wookey | 717/176 |
| 2002/0191014 | A1* | 12/2002 | Hsieh et al. | 345/738 |
| 2002/0194584 | A1* | 12/2002 | Suorsa et al. | 717/176 |
| 2002/0198727 | A1* | 12/2002 | Ann et al. | 705/1 |
| 2003/0126001 | A1* | 7/2003 | Northcutt et al. | 705/8 |
| 2004/0059611 | A1* | 3/2004 | Kananghinis et al. | 705/7 |
| 2004/0220792 | A1* | 11/2004 | Gallanis et al. | 703/13 |
| 2005/0137920 | A1* | 6/2005 | O'Connor et al. | 705/7 |
| 2005/0138074 | A1* | 6/2005 | O'Connor et al. | 707/104.1 |

OTHER PUBLICATIONS

Ali Bahrami, et al., "Enterprise Architecture for Business Process Simulation," Proceedings of the 1998 Winter Simulation Conference, pp. 1409-1413 (1998).*
Melody A. Rood, "Enterprise Architecture: Definition, Content, and Utility," IEEE, pp. 106-111 (1994).*
Ricardo Chalmeta, et al., "References Architectures for Enterprise Integration," 57 Journal of Systems and Software 175-191 (2001).*

(Continued)

*Primary Examiner* — Andre Boyce

(57) ABSTRACT

In one embodiment, a process for managing information technology (IT) infrastructure of an enterprise includes: (1) capturing and storing IT infrastructure information regarding the IT infrastructure of the enterprise; (2) defining a plurality of roles within the enterprise, each role specifying a particular job function within the enterprise; (3) associating items of IT infrastructure with roles within the enterprise such that each role is associated with one or more predetermined items of IT infrastructure; (4) assigning roles to one or more employees of the enterprise such that each of the one or more employees is associated with one or more roles and is assigned the one or more predetermined items of IT infrastructure associated with each of these one or more roles; (5) automatically modeling a change in the IT infrastructure for one or more impacted employees; and (6) automatically initiating deployment of one or more IT infrastructure assets for the one or more impacted employees by organizing delivery of the one or more IT infrastructure assets to the one or more impacted employees to implement the change modeled.

29 Claims, 5 Drawing Sheets

OTHER PUBLICATIONS

Wincor Nixdorf, "IMAC/R Installations, Moves, Additions, Changes and Removals (de-installations)," available at http://www.wincornixdorf.com/internet/index.html and http://www.wincornixdorf.com/internet/us/Services/EventServices/IMACR (last visited Apr. 20, 2004) (2 pp.), Sep. 29, 2003.

Unipress Software, Inc., "FootPrints Web-based Help Desk & Customer Problem Management Software," available at http://www.unipress.com;http://www.unipress.com/footprints/fam.html; and http://www.unipress.com/footprints/discstandard.html © 2004 (last visited Apr. 20, 2004) (6 pp.), Print Date Apr. 20, 2004

Siemens, "Siemens Business Services—IT Services," available at http://www.sbs.ie/index.html; http://www.sbs.ie/our_services/Maintenance/imac.html; and http://www.sbs.ie/our_services/Maintenance/maintain_and_support.html (last visited Apr. 20, 2004) (6 pp.), Print Date Apr. 20, 2004

\* cited by examiner

FIG. 3

CONCEPTS
I. ADMINISTRATION
    A. GROUPS
    B. SYSTEM USERS
    C. USER RIGHTS
    D. GEOGRAPHIC DATA
    E. ATTRIBUTE MAPPING

II. COLLABORATION
    A. NEWS
    B. FORUMS
    C. KNOWLEDGE BASE
    D. REPOSITORY

III. ESTATE
    A. EQUIPMENT
        i. ASSETS
        ii. LOAN EQUIPMENT
        iii. LICENSES
        iv. ORDERING
        v. STOCK
        vi. GOODS MOVEMENT
    B. SITE MAPPING
        i. SITE
        ii. BUILDINGS
        iii. WORK AREAS
        iv. LOCATION POINTS
        v. FACILITIES MANAGEMENT IV. IMAC
    A. ADDING PRODUCTS OR SERVICES
    B. REMOVING PRODUCTS OR SERVICES
    C. OFFICE MOVES V. ORGANIZATION
    A. DOMAINS
    B. GROUPS
    C. ROLES
    D. MEMBER OF STAFF
    E. BUSINESS STREAM VI. RESOURCING
    A. SITE ACTIVITIES
    B. SITE ACTIVITY PLAN
    C. SKILLS MATRIX
    D. RESOURCE TEAMS
    E. BANK HOLIDAYS
    F. SECURITY CLEARANCE
    G. PROJECTS

VII. SERVICES
    A. PRODUCT CATALOGUE
    B. SERVICE LIST
    C. CATEGORIES

VIII. TOPOLOGY
    A. BUSINESS RULES
    B. BUILD KEYS
    C. DNS NAMES
    D. IP ADDRESSES

IX. WORKFLOW
    A. SERVICE MANAGEMENT
        i. INCIDENTS
        ii. ESCALATIONS
        iii. PERSONAL FOLLOW-UPS
        iv. TEAM FOLLOW-UPS
        v. SERVICE PROVIDERS
            a. CONTRACTS
            b. SERVICE LEVEL AGREEMENTS (SLAs)
    B. WORK HANDLING
        i. DROP SHEETS
        ii. LOW LEVEL CONFIGURATION
        iii. USER ACCEPTANCE TESTING

100

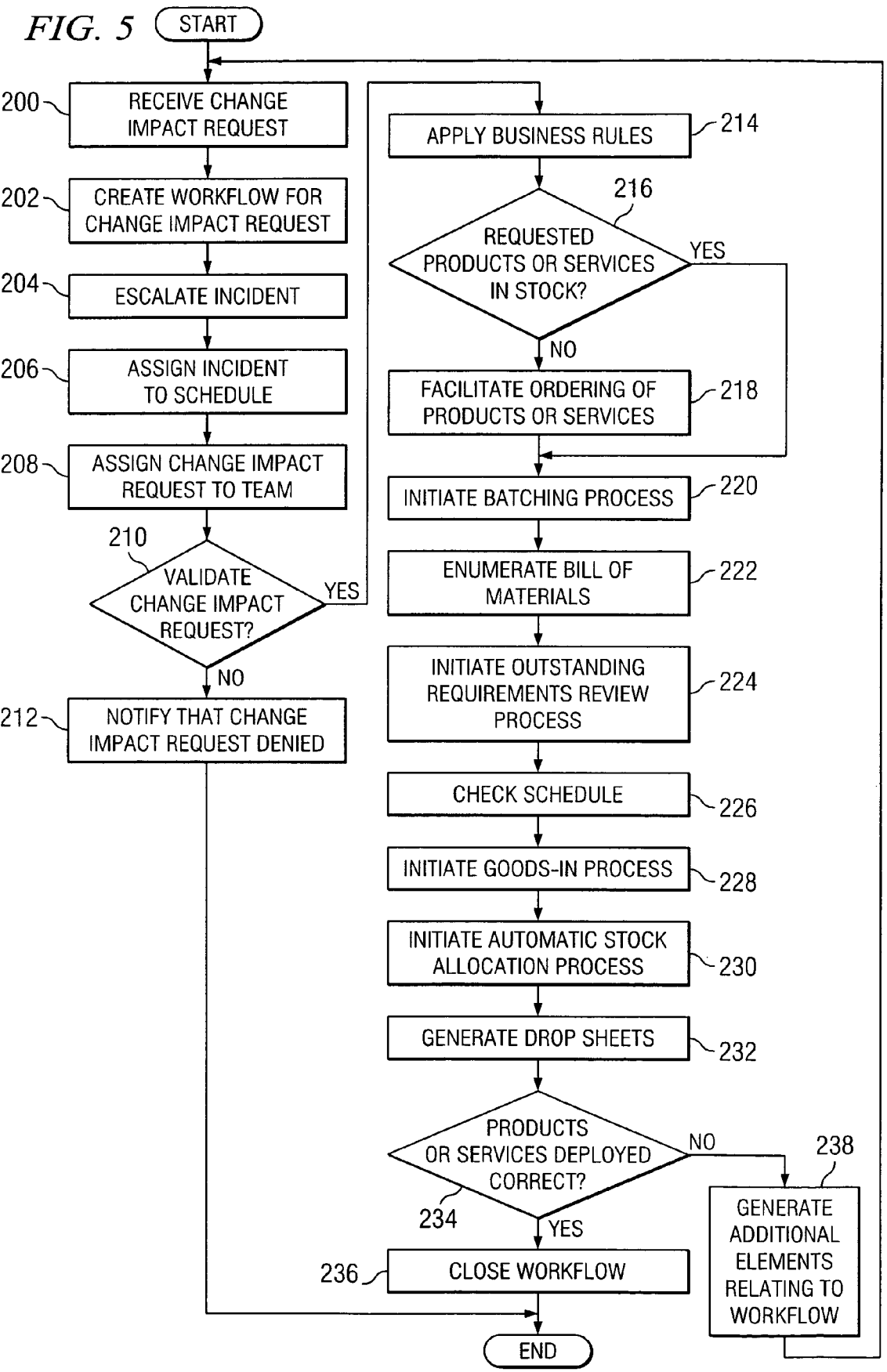

MANAGING INFORMATION TECHNOLOGY (IT) INFRASTRUCTURE OF AN ENTERPRISE USING A CENTRALIZED LOGISTICS AND MANAGEMENT (CLAM) TOOL

TECHNICAL FIELD OF THE INVENTION

This invention relates generally to information technology (IT) management, and more particularly to managing IT infrastructure of an enterprise using a centralized logistics and management (CLAM) tool.

BACKGROUND

Many business enterprises have a complex IT infrastructure. The IT infrastructure may include computer hardware, computer software, and other IT resources. Managing the IT infrastructure of an enterprise is generally a complex task requiring the collection and management of large amounts of information. This task may be particularly complex as an enterprise experiences infrastructure changes, such as those associated with adding employees, moving employees between locations, or adding a new division or location. Infrastructure changes may range from changes at the employee level to changes across the entire enterprise or a division within the enterprise. Current techniques for managing IT infrastructure of an enterprise involve a number of disparate tactical tools that require reentry of data and checking data against multiple data sources.

SUMMARY OF THE INVENTION

According to the present invention, disadvantages and problems associated with previous techniques for IT infrastructure management may be reduced or eliminated.

In one embodiment, a process for managing information technology (IT) infrastructure of an enterprise includes: (1) capturing and storing IT infrastructure information regarding the IT infrastructure of the enterprise; (2) defining a plurality of roles within the enterprise, each role specifying a particular job function within the enterprise; (3) associating items of IT infrastructure with roles within the enterprise such that each role is associated with one or more predetermined items of IT infrastructure; (4) assigning roles to one or more employees of the enterprise such that each of the one or more employees is associated with one or more roles and is assigned the one or more predetermined items of IT infrastructure associated with each of these one or more roles; (5) automatically modeling a change in the IT infrastructure for one or more impacted employees; and (6) automatically initiating deployment of one or more IT infrastructure assets for the one or more impacted employees by organizing delivery of the one or more IT infrastructure assets to the one or more impacted employees to implement the change modeled.

In certain embodiments, the CLAM tool provides a uniform approach to IT infrastructure management, which may be customized to use a particular enterprise's terminology, possibly reducing or eliminating ambiguity and misunderstandings in IT infrastructure management. While current techniques for IT infrastructure management involve a number of disparate tactical tools that require reentry of data and checking data against multiple data sources, in certain embodiments the CLAM tool facilitates providing substantially all project and IT infrastructure information in one resource. In certain embodiments, the CLAM tool is a web-based, custom application. In certain embodiments, the CLAM tool allows for the collection, modeling, and deployment of technology, while automatically collaborating information on a global or other suitable geographic basis.

In certain embodiments, the CLAM tool allows quality management reports to be delivered to one or more email accounts, in Portable Document Format (PDF) format for example, substantially without user interaction. In certain embodiments, multiple accounts and project databases can be configured for use within the CLAM tool. In certain embodiments, the CLAM tool may provide an on-the-road facility, which enables data to be extracted and later synchronized back to a central location. In certain embodiments, the CLAM tool uses a permissions-based security model, which may allow it to be used by numerous parties.

In certain embodiments, the CLAM tool is an integrated solution that provides a document repository, knowledge base, forums, news bulletins, asset management, configuration control, deployment modeling, and other features. The CLAM tool may also provide procedural service management, escalation, and follow-up provisions as they relate to Service Level Agreements (SLAs). In certain embodiments, CLAM provides quick access to progress, documentation, advisories, hints and tips, knowledge base, news, team bulletins, discussions, follow-ups, reminders, and other suitable information.

In certain embodiments, the CLAM tool may deliver cost benefits by one or more of the following: increasing productivity and visibility through workflows; consistently managing change; automating complex tasks; auditing and modeling an enterprise's IT infrastructure; effectively collaborating business knowledge; coordinating an install, move, add, or change (IMAC) process alongside rollout; orchestrating service delivery; or by providing other suitable features.

Certain embodiments of the present invention may provide some, all, or none of the above technical advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and features and advantages thereof, reference is now made to the following description, taken in conjunction with the accompanying drawings, in which:

FIG. 3 illustrates an example logical arrangement of example CLAM concepts;

FIG. 5 illustrates an example method for processing a workflow using a CLAM tool.

DESCRIPTION OF EXAMPLE EMBODIMENTS

Figure 1:
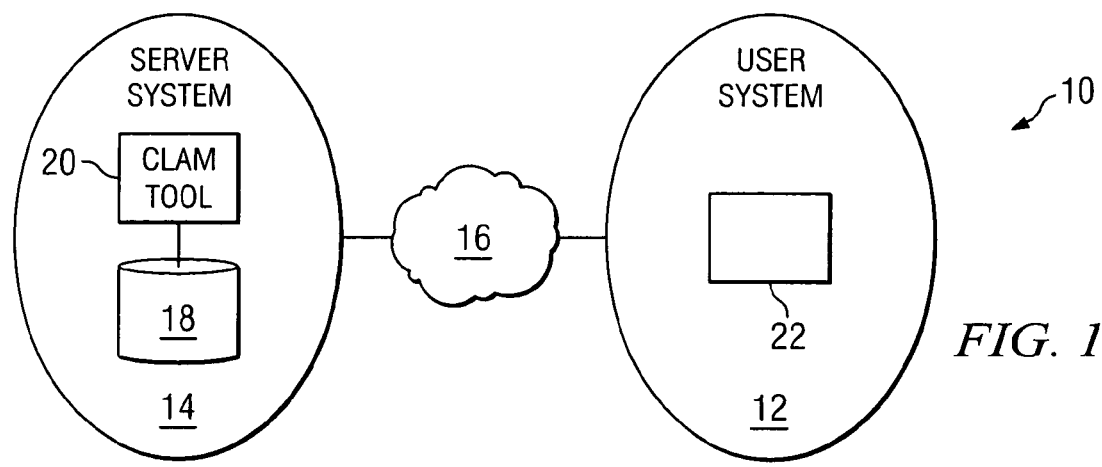
FIG. 1 illustrates an example system for managing IT infrastructure of an enterprise using a CLAM tool.

FIG. 1 illustrates an example system 10 for managing IT infrastructure of an enterprise using a centralized logistics and management (CLAM) tool. In one embodiment, system 10 includes one or more user systems 12 coupled to a server system 14 via a network 16. Other embodiments of system 10 may be used without departing from the scope of this description.

In general, system 10 may enable storage of information regarding the IT infrastructure of an enterprise and may use the stored IT infrastructure information to manage the IT infrastructure of the enterprise. IT infrastructure of an enterprise may include the facilities, services, and installations needed for the functioning of the enterprise. IT infrastructure, for example, may include computer hardware, computer software, and other IT resources. Although IT infrastructure information is primarily described, the present invention contemplates storing information about and managing any suitable infrastructure of an enterprise, according to particular needs. Furthermore, although the term "enterprise" is used primarily to refer to a business enterprise, the present invention contemplates IT infrastructure management of any suitable organization and the term "enterprise" is intended to encompass all such enterprises. In one embodiment, system 10 provides a web-based solution for retaining and managing IT infrastructure data. The design of system 10 may be based on one or more templates such as one or more template tables, which may provide simple navigation via a suitable web browser. System 10 may allow users to work with data in substantially real time, while uploading and downloading information as desired. In one embodiment, system 10 is managed using built-in security, policing, auditing, and other suitable features.

As an example, system 10 may store IT infrastructure information of a particular enterprise. The IT infrastructure information, among other data, may include human resource data such as the names of employees, employee details, cost centers associated with the employees, business units with which an employee is associated, or any other suitable information. An employee's physical location may be modeled, possibly including where the employee sits and uses IT infrastructure. Using system 10, the IT infrastructure information may be stored and managed in such a way that when a new employee is added to the enterprise, a current employee is moved within the enterprise, new divisions or locations are added, or other suitable changes in IT infrastructure are needed or desired, assigning IT infrastructure to the appropriate individuals or entities is a relatively automated process.

In an example in which a current employee is issued a replacement desktop computer, system 10 may use the stored infrastructure information to model the replacement desktop computer to ensure that the employee's current functionality is maintained and leveraged to the employee's replacement desktop computer. System 10 may help ensure that the replacement desktop computer includes the employee's needed software, preferred settings, network assignments, other suitable products or services need by the employee, or any other suitable information. System 10 may also help ensure that business rules of the enterprise are followed. System 10 may also help ensuring that the replacement desktop computer as configured for the employee is compatible with the new environment, and if not, help determine a solution. Although this example describes a single employee, the present invention contemplates using system 10 to manage "bulk" changes in IT infrastructure of an enterprise.

In addition to storing suitable IT infrastructure information, system 10 may use suitable combinations of the stored infrastructure information to generate a logical implementation for delivering appropriate infrastructure, to appropriate locations or employees for example. This may include assembling one or more human resources and equipment resources to deliver the properly configured IT infrastructure to the appropriate location.

To assist in change management, system 10 may help assemble IT infrastructure information into manageable blocks, which may be referred to as work packages. Work packages may be coordinated through a resource process within system 10 to help coordinate the appropriate resources for delivering what is needed for the change. This may include coordinating the delivery of equipment through one or more logistics modules and in conjunction with the availability of resources based on geographic location, helping to ensure that the appropriate resources nearest a particular installation location are used.

At a broad level, system 10 may enable one or more of the following features:

IT Infrastructure Maintenance

Maintaining the needs of IT infrastructure users and their equipment, services, and location may be difficult. System 10 may bring together the service management requirements of demanding users and the service delivery practices of an enterprise. For example, system 10 may consolidate harvested inventory and topology data, together with project documentation and business rules. System 10 may provide a common framework, which may be invoked by a developer to automate complex tasks such as reporting, data auditing, code error validation, page navigation, uploading and downloading of files, security monitoring, and other suitable tasks.

A developer may, in one embodiment, create one or more databases using Structured Query Language (SQL) or any other suitable protocol, which system 10 can reference dynamically. This may help the developer customize system 10 for specific needs. Using certain security measures, a database selection screen may be invoked, should a user have access to more than one database. By managing complex activities using a workflow, service requests may be approved, managed, designed, and deployed, while automatically collaborating progress and validating such progress. In one embodiment, the workflow may be managed in-line with service level agreements (SLAs), which may carry stringent time frames and serviceability penalties.

Automation

In one embodiment, system 10 provides email capabilities that allow for automated escalations to concerned parties, so that service compliance may be monitored and achieved by the concerned parties or any other suitable person or enterprise. System 10 may automatically deliver statistical graphs or other data-driven management reports directly to one or more email accounts of users, in PDF format for example. In one embodiment, this feature may be scheduled and executed substantially without user intervention.

In one embodiment, system 10 differs from previous solutions in that system 10 provides more than just a single install, move, add, and change (IMAC) product. System 10 may allow for the retirement and refresh of bulk products and/or data by utilizing simple data input. System 10 may identify retirement or deployment needs and coordinate them through an automated workflow, which may reduce user intervention.

Geographic Resources

In one embodiment, system 10 is preloaded with geographic data, which may allow system 10 to identify local resources, possibly saving unnecessary travel costs and other expenditures. Furthermore, a workflow process, an example of which is described below with reference to FIG. 4, may ensure that when a resource (e.g., an IT employee) visits a site, any required equipment is readily available, possibly saving potentially costly revisits to the site.

Niche Product

In one embodiment, system 10 provides more than a simple data repository. System 10 may use and reuse the information supplied to report, collaborate, act, and deploy. System 10 may bring together many functions, which include certain tools required to affect a technology refresh. A technology refresh may include the upgrading of IT equipment within an enterprise. System 10 may reduce labor-intensive tasks, increase productivity, increase visibility, improve manageability, and provide other suitable advantages. System 10 may balance simple user interaction with extensible processes to provide IT infrastructure management.

Returning to the example embodiment of system 10 illustrated in FIG. 1, user systems 12 may be referred to generally in the singular as user 12 or in the plural as users 12. Moreover, "user system 12" and "user of user system 12" may be used interchangeably. User systems 12 may be associated with an enterprise. In one embodiment, the enterprise with which user systems 12 are associated may be a client of an enterprise with which server system 14 is associated; however, the present invention contemplates user systems 12 and server system 14 being associated with the same enterprise. Users of user system 12 may include various employees of the enterprise, employees of a third party providing services to the enterprise, or any other suitable users according to particular needs. User system 12 may include any appropriate input devices, output devices, mass storage media, processors, memory, or other suitable components for receiving, processing, storing, and communicating information. Each user system 12 may operate using a different user platform, or two or more user systems 12 may operate using identical user platforms.

Although one user system 12 is illustrated, the present invention contemplates system 10 including any suitable number of user systems 12 according to particular needs. For example, in one embodiment, server system 14 is coupled to multiple distributed user systems 12. User systems 12 may be physically distributed, being in different physical locations geographically remote from each other and from server system 14, or logically distributed, being at approximately the same location as other user systems 12 and server system 14. Each user system 12 may be coupled to server system 14 via network 16. Network 16 may include one or more computer buses, local area networks (LANs), metropolitan area networks (MANs), wide area networks (WANs), a global computer network such as the Internet, or any other wireline, optical, wireless, or other links.

Server system 14 includes one or more electronic computing devices operable to receive, transmit, process, and store data associated with system 10. Server system 14 may include a web server. One function of the web server (or a pool of servers) might be to allow user systems 12 to send or receive content over or from the Internet using a standard user interface language such as, for example, Hypertext Markup Language (HTML). In one embodiment, server system 14 may accept input from user system 12 via a web browser and return appropriate HTML pages.

Server system 14 may include or may be otherwise coupled to a database 18, which may include any memory or database module and may take the form of volatile or non-volatile memory including, without limitation, magnetic media, optical media, random access memory (RAM), read-only memory (ROM), removable media, or any other suitable local or memory component. In one embodiment, database 18 includes one or more SQL servers. User systems 12, server system 14, and database 18 may each include an appropriate combination of hardware and software associated with one or more computer systems at one or more locations. These components of system 10 may share data storage, communications, or other resources according to particular needs. Each computer system may include one or more suitable input devices, output devices, mass storage media, processors, memory, or other components for receiving, processing, storing, and communicating information according to the operation of system 10.

Server system 10 supports a CLAM tool 20, which may be used to store information regarding the IT infrastructure of an enterprise and to manage the IT infrastructure of the enterprise using the stored IT infrastructure information, along with any other suitable information. In one embodiment, CLAM tool 20 is a web-enabled software application, although the present invention contemplates CLAM tool 20 being implemented in any suitable manner. In a particular embodiment, CLAM tool 20 may be written in Active Server Pages (ASP) and MICROSOFT Virtual Basic Scripts (VBScripts), and may use MICROSOFT SQL 2000 as a database 18. User systems 12 may interact with CLAM tool 20 using a graphical user interface (GUI) 22 such as may be associated with a web browser. Users of user system 12 may input and modify IT infrastructure information into GUI 22, and server system 14 may store and manipulate the IT infrastructure information in database 18. Any other type of interface could be used without departing from the scope of the invention.

In one embodiment, CLAM tool 20 may be generic such that any user (e.g., users of user systems 12 associated with different enterprises) begins with the same CLAM tool 20. Before or after components of CLAM tool 20 are installed, before components of CLAM tool 20 are downloaded from server system 14 for example, the user may be able to customize some or all of these components according to particular needs. As an example, a user may download CLAM tool 20 to the user's associated user system 12. The user may then customize the downloaded CLAM tool 20 or particular components of CLAM tool 20 for installation on a platform associated with user system 12. A user may customize CLAM tool 20 according to the nature, size, budget, or preferred terminology of the associated enterprise for example. As another example, a user may use a user system 12 to customize CLAM tool 20 at server system 14. Server system 14 may compile and package selected components of CLAM tool 20, such as the customized components, to create a CLAM tool 20 that is customized for the enterprise associated with a user system 12. Server system 14 may communicate those components to user system 12 for installation of CLAM tool 20 on user system 12. Alternatively, server system 14 may compile and package the selected components of CLAM tool 20 for installation of the customized CLAM tool 20 on server system 14, the customized CLAM tool 20 being made accessible to user system 12 in a secure manner. In one embodiment, the compiled and packaged components of CLAM tool 20 may include generic components not customized by the user.

As briefly described above, CLAM tool 20 may be used to manage the IT infrastructure of an enterprise. In terms of IT infrastructure management, an enterprise may cycle through three phases: a present mode of operation, a transitional mode of operation, and a future mode of operation. In one embodiment, one purpose of CLAM tool 20 is to assist an enterprise in transitioning through these modes of operation. For example, CLAM tool 20 may cycle through three phases of operation, which may correlate to the phases of the enterprise: a capture phase in which existing assets and or requirements are determined and stored, a model phase in which a proposed environment is created, and a deploy phase in which proposed changes are implemented. Although these three phases are primarily described, the present invention contemplates CLAM tool 20 cycling through any suitable phases, according to particular needs. Furthermore, the terms used to describe the phases are provided as merely examples and are not meant in a limiting sense.

The capture phase may include capturing certain infrastructure information about the enterprise. This captured information may be divided into two areas: an existing area and a requirements area. The existing area may include location profiles, asset profiles, service profiles, staff profiles, business profiles, and any other suitable information according to particular needs. The existing area may be used to capture the existing picture of an enterprise's assets, including the enterprise's infrastructure. An enterprise's infrastructure may include hardware, software, services, members of staff, workplaces, premises, organizational units structure, topology, logistics, facilities, and any other suitable assets according to particular needs. The requirements area may include a process known as an install, move, add, and change (IMAC) process. The requirements area may include an impact analysis involving users, products, services, locations, work areas, buildings, topologies, stock, licenses, migration strategy, schedule, resources, and any other suitable considerations according to particular needs.

In order to implement change in an enterprise's infrastructure, it may be necessary to model the proposed change. For example, topology considerations such as network addressing, connectivity, and server mapping may be important. As another example, validation considerations such as business rules, automatic evaluation, shared profiles, and environmental issues may be important. Business rules may include virtual trunk protocol (VTP), virtual local area network (VLAN), Internet protocol (IP) address ranges, port mappings, domain name server (DNS) naming, build key production, domain rules, building rules, work area rules, equipment type rules, product rules, service rules, and any other suitable rules according to particular needs.

To deploy assets in the deploy phase of CLAM, important considerations may include stock availability, license availability, ordering, delivery tracking, geography, resources, schedule, the IMAC process, user acceptance testing (UAT), and any other suitable considerations according to particular needs.

CLAM tool 20 may facilitate storage of certain information of an enterprise in order to facilitate IT infrastructure management. In one embodiment, the information is stored in database 18. For example, CLAM tool 20 may facilitate storage of building and site information for the enterprise. A building may include a premises in which the enterprise operates. An enterprise may include one or more buildings at one or more geographic locations. A site may include a collection of buildings in the same vicinity. Building and site information may include one or more building or site addresses, one or more building or site delivery addresses, parking details, access hours, restrictions, security measures, closures, contacts, global positioning system (GPS) data, or any other suitable information according to particular needs.

As another example, CLAM tool 20 may facilitate storage of work area information for the enterprise. A work area may include a floor and reference where one or more members of staff execute their job duties. An enterprise, site, or building may each include any suitable number of work areas. Work area information may include floor, name, type (e.g., room, area, cell, etc.), access hours, restrictions, security measures, closures, contacts, or any other suitable information according to particular needs.

As another example, CLAM tool 20 may facilitate storage of location point information. A location point may include a specific desk or place within a work area where products and services are either used or required. An enterprise, site, building, or work area may include any suitable number of location points. Location point information may include one or more members of staff, assets, products, services, topology data, contact information, or any other suitable information according to particular needs.

As another example, CLAM tool 20 may facilitate storage of member of staff information for one or more members of staff of the enterprise. A member of staff may include a person who is employed by the enterprise and who uses products and services. An enterprise, site, building, work area, or location point may include any suitable number of members of staff. Member of staff information may include staff ID, name (including title, first name, middle name, and last name), "known as" name, contact details, organization unit, cost center, type of staff, type of employment, current email address, or any other suitable information according to particular needs.

As another example, CLAM tool 20 may facilitate storage of asset information for one or more assets of the enterprise. An asset may include a product that is managed by CLAM tool 20. An enterprise, site, building, work area, location point, or member of staff may include any suitable number of assets. Asset information may include asset ID, serial number, IP address, Media Access Control (MAC) address, DNS name, software profile, user profiles, location point, or any other suitable information according to particular needs.

As another example, CLAM tool 20 may facilitate storage of resource information for one or more resources of the enterprise. An enterprise, site, building, work area, location point, member of staff, or asset may include any suitable number of resources. Resource information may include resource details, GPS location, team, availability, skills, security clearance, loaned equipment, or any other suitable information according to particular needs.

As another example, CLAM tool 20 may facilitate storage of logistics information for the enterprise. Logistics information may include vendor details, part numbers, SLAs, bill of materials, goods-in/goods-out information, stock control, license control, site-specific instructions, or any other suitable information according to particular needs.

CLAM tool 20 may maintain a product catalogue, which may be a "shopping list" of available products and services. CLAM tool 20 may maintain one or more user-specific lists. A user-specific list may include a list of selected products and services taken from the product catalogue. For example, a user-specific list for a web developer may include MICROSOFT WEB MATRIX, .NET framework, or any other suitable products or services according to particular needs. CLAM tool 20 may maintain one or more machine-specific lists. A machine-specific list may include a list of selected products and services taken from the product catalogue. For example, a machine-specific list for a common office environment (COE) PC may include DELL P4 base unit, 15" monitor, keyboard, mouse, fly lead, MICROSOFT WINDOWS 2000 PROFESSIONAL EDITION, MICROSOFT OFFICE, virus protection software, or any other suitable products or services according to particular needs.

Figure 2:
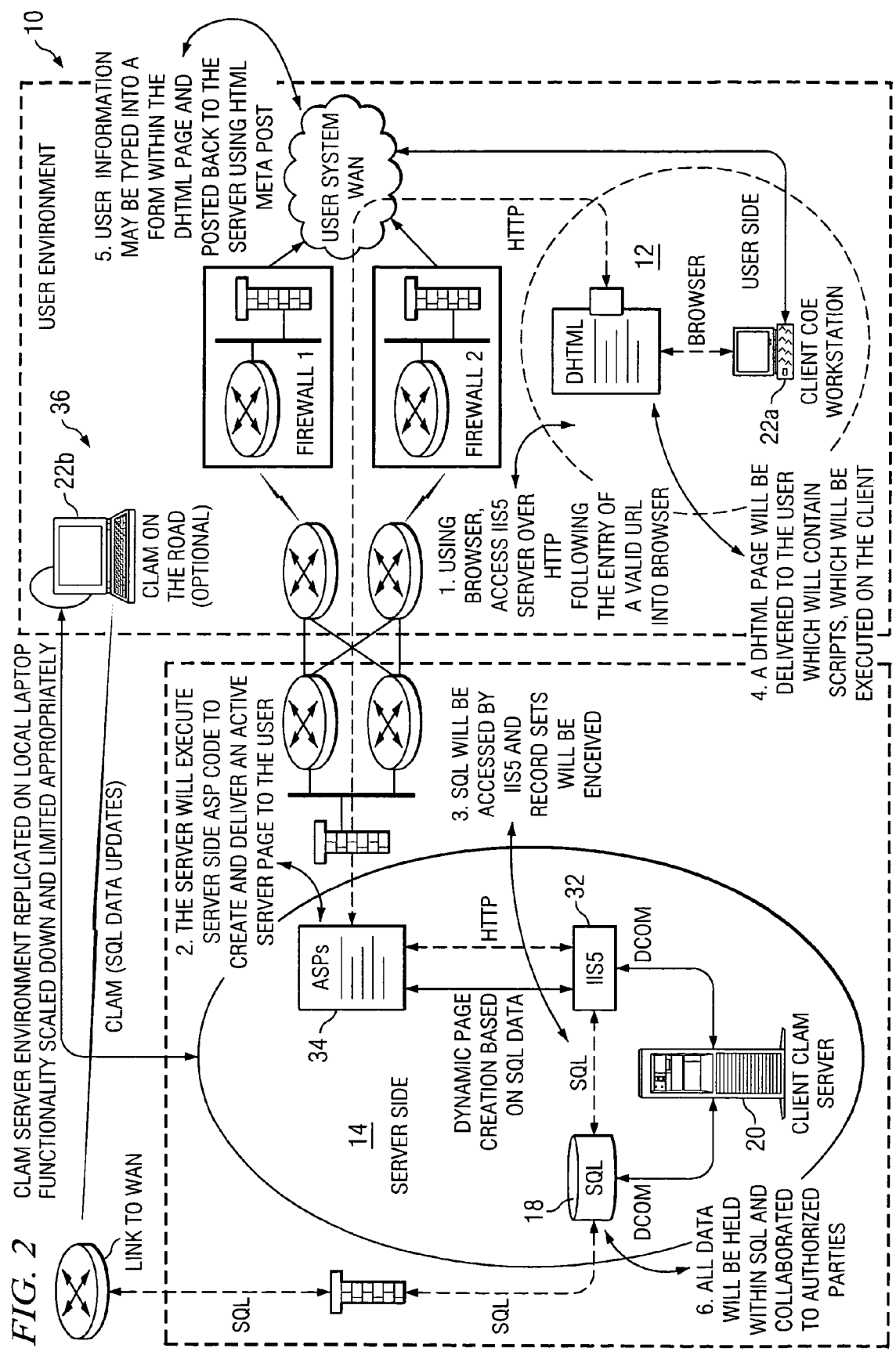
FIG. 2 illustrates a more particular example implementation of a system for managing IT infrastructure of an enterprise using a CLAM tool.

FIG. 2 illustrates a more particular example implementation of system 10. This example implementation is provided for example only and not by way of limitation. In operation of system 10, a user may use browser 22 to access a server 32 of server system 14 over a hypertext transfer protocol (HTTP) or other suitable connection following the entry of a valid uniform resource locator (URL) into browser 22. In one embodiment, server 32 is a MICROSOFT INTERNET INFORMATION SERVER 5 (IIS5), although the present invention contemplates server 32 being any suitable type of server, according to particular needs. Server 32 may execute one or more server side ASPs 34 to create and deliver an ASP to the user. Server 32 may access database 18 (e.g., an SQL database) and transfer one or more record sets.

A dynamic HTML (DHTML) or other suitable page may be delivered to user system 12, which may include active scripts (e.g., VBScripts) that may be executed on user system 12. User information may be typed into or otherwise inserted into a form within the DHTML page and posted back to server 32 using HTML META POST or otherwise. Data may be stored on database 18 and communicated and collaborated to appropriate individuals. The data may include data associated with CLAM tool 20 such as asset information, staff contact details, premises information, logistics details, existing and proposed hardware and software, organizational units, topology information, project documentation, workflow data, project statistics and metrics, or any other suitable data according to particular needs. In one embodiment, system 10 includes a CLAM "on-the-road" capability 36, which may enable updates to data within CLAM tool 20 via a laptop computer or other portable computing device. The environment of CLAM tool 20 may be substantially replicated on the laptop, with functionality scaled down and limited as needed or desired.

FIG. 3 illustrates an example logical arrangement of example CLAM concepts 100. The content and arrangement of concepts 100 illustrated in FIG. 3 merely represent a non-limiting example. Concepts 100 illustrated may not be required and others not listed may be included and still fall within the spirit and scope of the present invention. In one embodiment, concepts 100 are customizable, for example, for particular enterprises, for enterprises within a particular industry, or in any other suitable manner. Example concepts 100 are described in more detail below.

I. Administration

A. Groups

Employees or other suitable individuals within an enterprise may be assigned to one or more groups to allow them to access CLAM tool 20. In one embodiment, in order to access and use CLAM tool 20, an employee must be assigned to a group in order to log into CLAM tool 20. In one embodiment, an employee may only be assigned to groups that have the correct permissions for the employee's job role (i.e. an administrative assistant will only be assigned to the group that gives the administrative assistant access to the functions within CLAM tool 20 that are appropriate for administrative assistants). An administrative assistant, therefore, would not typically be assigned to a group that is set up for the payroll department, unless that is also part of the administrative assistant's job function.

B. System Users

A system user may include an individual who is given permissions to use the functions of CLAM tool 20. In one embodiment, CLAM tool 20 defines three types of users: (1) the member of staff; (2) the third-party user; and (3) the system user. A system user may include an individual who is not a member of the enterprise's staff or a third party with which the enterprise is associated. A system user may be assigned to groups that encompass one or more of the permissions associated with the system user's job role.

C. User Rights

User rights may include permissions that are assigned to groups to allow access to one or more predefined menu structures. User rights may be assigned to users via the group or groups to which users are assigned (i.e. when a user is assigned to a group, the user is assigned the rights associated with that group). For example, a user may be allowed to view one or more menu structures within CLAM tool 20; however, the user may only be permitted to see the menu structures associated with the permissions of the user.

It may be desirable for users to be able to view and use only the areas of CLAM tool 20 that are a part of their job functions. This may create a secure environment, allowing users to view and use only their allowed areas. This may limit the information presented to a user of CLAM tool 20 and filter certain information in CLAM tool 20 that a user does not need or that is not relevant to a particular user, possibly reducing confusion. For example, CLAM tool 20 may include one hundred menus from which to choose, but a particular user may only need five of the menus. Thus, it may be desirable to "hide" the other ninety-five from that user by the permissions that are assigned to the user.

D. Geographic Data

Geographic data may include the substantially exact global positioning of a city, town, street, office building, or any other suitable location. Geographic data may be captured with the longitude and latitude of each city, town, street, office building, or other suitable location being input into CLAM tool 20. Geographic data may be used within CLAM tool 20 so that resources local to a particular geographic location may be recognized and used effectively. For example, an engineer may be needed on site at a particular location, and the resource department may check the list of all engineers qualified to complete this assignment. However, without the availability of geographic data for each engineer, the resource department may choose an engineer who lives somewhere relatively distant from the particular location, when someone closer may actually be available.

E. Attribute Mapping

Attribute mapping may include mapping an organization's information into CLAM tool 20. It may be desirable to input certain information into CLAM tool 20 that the enterprise may have already compiled. However, the naming conventions used by the enterprise may differ from those used in CLAM tool 20. In one embodiment, CLAM tool 20 may provide the ability to link enterprise data to a specific area within CLAM tool 20 without requiring the same naming conventions.

II. Collaboration

A. News

News may include an area within CLAM tool 20 where topical information is stored for the purpose of distributing news to a predefined audience. A user with appropriate permissions may add what the user deems as a news item to this area. The user may assign the news item to one or more groups, which the user desires to have permission to view the news item. Files may be attached to a news item. In one embodiment, before a news item is released to the one or more selected groups, the news item is placed in a holding area where it is policed by appropriate personnel (i.e. those users with the appropriate permissions) to see if the material is appropriate for viewing.

In one embodiment, an expiration date may be specified when a news item is created such that on or after the expiration date, the news item is deleted. In one embodiment, users having access to news items may police the news items to which they have access. For example, if a user finds a news item offensive, the user may be allowed to remove the news item. However, in certain embodiments, this news item may not be deleted automatically. Rather, it may be sent to another user with the appropriate permissions to police the news item with the authority to make a final decision regarding deletion of the news item.

A user may be able to view all news items of a particular group of which the user is a member, or the user may be able to substantially simultaneously view all news items for all groups of which the user is a member. In one embodiment, users also have the ability to search for news items. In one embodiment, each created news item may have an auditable trail including who created the news item, when it was written, and its input location.

B. Forums

A forum may include a discussion area where individuals may discuss issues. Typically, any user who has the correct permissions for this area may add a discussion entry. In one embodiment, an expiration date may be specified for the discussion entry so that the discussion entry may be removed on or after the expiration date. A creator of a discussion entry (e.g., a user) may assign the discussion entry to one or more groups that the creator thinks should be able to view the discussion entry. A user who is a member of the groups to which a discussion entry is assigned may be able to view and post replies to the discussion item. The user may also be able to view all replies to the discussion item. In one embodiment, a user may be able to search for discussion items that the user desires to view. The user may be able to view forum discussions by a group or view all discussions from all of the groups of which the user is a member.

C. Knowledge Base

A knowledge base may include an area where any suitable information a user determines to be useful can be posted or otherwise made available. In one embodiment, some or all entries posted to the knowledge base are reviewed for content to help prevent inappropriate material from being posted. In one embodiment, each item in the knowledge base is given an expiration date such that on or after the expiration date, the item may be deleted or the expiration date may be extended. A user posting an item in the knowledge base may also assign select system groups that can access the item so that only users to whom the item is relevant can access the item.

As an example, an article may be posted in the knowledge base under one of three categories: hints and tips, advisories, and knowledge base entries. While these three categories are described, the present invention contemplates the knowledge base including any other suitable categories according to particular needs. These three example categories may be used in the following manner:

i. Hints and Tips

Hints and tips may include information posted to the knowledge base by a user having the appropriate permissions that the user believes may be useful to other users. Information categorized as hints and tips may include a helpful statement or tip that is work-related or any other suitable information.

ii. Advisories

Advisories may include a work-related definitive process or procedure that is posted to the knowledge base by a user having the appropriate permissions. As an example, advisories may include a "how-to" guide such as written instructions for completing a form.

iii. Knowledge Base Entries

Knowledge base entries may include items that relate to a problem and, if available, the resolution of the problem. As an example, a user may post a problem the user has encountered. Replies that include a possible solution to the user's post may then be posted by other users (or the same user if the user otherwise determines a solution). In one embodiment, solutions must be verified as working solutions before they may be added as replies in the knowledge base entries category. Additionally, other users may reply to the post to indicate that they have encountered a similar problem.

D. Repository

A repository may include an area associated with CLAM tool 20 for storing documents or files. A user having appropriate permissions may be able to upload documents or files. In one embodiment, users can upload documents and files in real time. Each document or file may be policed before it is posted in the repository to help ensure that it is appropriate for the groups or other audience to whom it has been assigned (e.g., by the user). Once the document or file is posted to certain groups, only users in those groups may be able to access the file or document.

In one embodiment, a document or file may be retired in one of two ways. First, the document or file may be given an expiration date such that on or after the expiration date, the item may be deleted or the expiration date may be extended. Second, a document or file may be manually deleted if, for example, the document or file in question is superceded or is no longer required by the groups to which it is assigned.

III. Estate

A. Equipment i. Assets

An asset may include a physical item of computer equipment, for example, which is managed by CLAM tool 20. For purposes of this description, the term "asset" is a generic term given to any valuable item. In one embodiment, the term "asset" refers to any piece of computer equipment that is retained on the asset register of CLAM tool 20. An enterprise may include any suitable number of assets. The IT infrastructure of the enterprise may include one or more of the assets.

a. Asset Management

To effectively manage IT infrastructure of an enterprise, a survey may be taken to obtain a concise inventory of what equipment is currently deployed within the enterprise. Obtaining this inventory may help manage changes to the enterprise's environment, such as the movement of an asset or the addition of one or more assets, helping to ensure a successful transition in state of the environment. Due to the typical portable nature of assets, it may be desirable for each asset to be recorded and tracked. In one embodiment, a physical label or other suitable tag may be affixed to each asset for simple and unique identification. The unique asset label or tag may be referred to as an asset ID and may be managed using this reference.

b. Asset Self Registration

An established environment for a particular enterprise may include hundreds, thousands, or any other suitable number of assets. Capturing information such as model numbers, serial numbers, location, and other suitable information may be a considerable task. In one embodiment, CLAM tool 20 provides a user the ability to enter the user's own asset details. This may distribute the often laborious task of entering asset details across all users who use assets. CLAM tool 20 may effectively manage the capture of asset details and reduce or eliminate duplication by recording the asset data and making it a self-registration system.

CLAM tool 20 may facilitate the entry of more technical information such as the products or services installed for a particular asset. An asset profile for a particular asset may include technical information and user information for the asset. In one embodiment, more than one user may be associated with a particular asset. For example, a printer may be used by multiple users on a floor of a building. An asset profile may be useful for providing essential information such as what user uses a particular asset and where the asset is located within a building, for example. An asset profile may be used to identify whether an asset should be replaced, installed products such as software should be upgraded, or other suitable information.

c. Commissioning an Asset

When a new asset is deployed, information about the asset may already be stored in CLAM tool 20. For example, the internet protocol (IP) Address and DNS name may be input into CLAM tool 20 before a new asset is actually deployed. CLAM tool 20 may be able to validate this information when the asset is installed. By using the known IP address and DNS name, CLAM tool 20 may be able to tie the logical "addressing" with the physical equipment asset ID and serial number. Furthermore, CLAM tool 20 may ensure that an asset is using the appropriate addresses (i.e. the addresses it was meant to be assigned) and in one embodiment, may automatically report a discrepancy. This capability may be beneficial because duplicating an address may cause network conflict.

d. Moving Assets

Storing asset information using CLAM tool 20 may also help when moving equipment from one location to another by creating an auditable trail of the asset's location. By effectively identifying single or bulk assets, CLAM tool 20 may be able to orchestrate movement of assets between buildings, work areas, or other suitable locations.

e. Loaned Assets

Within CLAM tool 20, it may be possible to identify an asset that can be loaned to one or more users. CLAM tool 20 may facilitate loaning of assets to certain users and tracking the asset's location and when the asset should be returned.

ii. Loan Equipment

Loan equipment may include an asset that has been identified as available for loan. In one embodiment, it is possible to identify a particular asset that can be loaned to a particular individual, which may simplify tracking of portable assets on a user-by-user basis. The IT infrastructure of the enterprise may include some or all of the loan equipment.

a. Booking

CLAM tool 20, in addition to tracking which assets are on loan, may facilitate reservation or booking of assets from/to a particular date and time. This capability may ease monitoring of available assets and help identify which assets are available at a particular time.

b. Loan Equipment in the Enterprise

More than one asset may be available for loan in an enterprise, at a particular office for example. CLAM tool 20 may facilitate searching for the type of asset a user requires, in a particular building on a particular date for example. This may help prevent the transportation of assets from one building to another when there is already a similar asset available for loan in the building in which the user seeking to loan the asset operates.

iii. Licenses

A license may include the authorized use of software, firmware, or hardware by a member of staff or other suitable user. CLAM tool 20 may capture licenses and use the captured licenses to validate and track the number of licenses in use for a particular software product or other suitable product. The IT infrastructure of the enterprise may include one or more of the licenses. In one embodiment, CLAM tool 20 may include an ordering process for ordering software (or possibly more licenses to use or copy a software product) or other suitable products. The ability to validate and track licenses may enable the ordering process to identify when additional licenses should be ordered. Additionally, the ability to validate and track licenses may be useful when retiring a product, because for example if that product has an upgrade path, the original license for the product often may be used to discount the price of the upgrade. Knowing the number of licenses for a particular product may enable CLAM tool 20 to track the number of licenses in use, the number of licenses available for reuse, and how many licenses need to be ordered.

a. License Keys

Licenses may be associated with one or more qualifying algorithms, which may include an alphanumeric string or other key. The key may be required to validate and/or enable the installation of the product associated with the license. In one embodiment, the key is entered into CLAM tool 20 for a particular product version. This may reduce or eliminate the probability of physically losing the license.

b. License Types

Certain ULAs may alter the manner in which the number of licenses is counted. Some ULAs calculate the number of licenses per processor, which typically means one license per computer on which the product is installed. Some ULAs calculate the number of licenses per enterprise, which typically means that a license is purchased for an entire enterprise regardless of how many times the product is used within the enterprise. Some ULAs calculate the number of licenses per server. In one embodiment, the manner in which ULAs calculate the number of licenses is stored by CLAM tool 20, in database 18 for example.

iv. Ordering

In one embodiment, CLAM tool 20 may include an ordering process for requesting products or services from a third party. For example, CLAM tool 20 may be able to produce a bill of materials based on batched requirements that cannot be fulfilled by available stock and/or licenses. Within a product catalogue, a breakdown of additional items can be entered for each item. For example, a workstation within the product catalogue may have a number of items associated with it, such as a monitor, keyboard, mouse, one or more cables. This may be referred to as an additional items list.

a. Additional Items

When assigning a member of staff or a machine to a group or role, CLAM tool 20 may be able to identify which products and services are associated with that group or role, which may allow CLAM tool 20 to identify what products, licenses, or other items need to be ordered. CLAM tool 20 may check what stock is available for those products, licenses, or other items (e.g., for a specific location). CLAM tool 20 may collate one or more of orders on a location-by-location and vendor-by-vendor requirements list. Each requirements list can be reviewed and approved or batched for ordering. Grouping the products, licenses, and other items in this manner may identify where the products should be delivered and from whom the products, licenses, and other items should be ordered.

b. Batch Report

Subsequent to an approval or batching process, batch report may be produced to assist in a procurement process. The batch report may identify products, licenses and other items with accumulated quantities. The batch report may include a batching reference, which may help prevent placement of duplicate orders.

c. Vendor Part Numbers

To enable third-party vendors to fulfill orders placed using CLAM tool 20, it may be possible to enter a vendor reference or part number for each product, license, or other item ordered. Using the vendor reference or part number may help minimize or eliminate confusion between the vendor and the procurement.

d. Lead Times

In one embodiment, CLAM tool 20 may allow lead times to be entered for one or more of the products, licenses, or other items ordered, which may identify expected product delivery time once the product has been ordered.

e. Goods-In

When a product or other item is delivered to a particular delivery address, a delivery note may be entered into CLAM tool 20 to advise of the product's or other item's arrival. Once products or other items are in stock, CLAM tool 20 may automatically begin allocating stock to be deployed against the collated list that was used to order the products or other items. This may begin what is referred to for purposes of this description as a commissioning process.

f. Stock

Stock may include products or other items that are available for deployment to a particular location. For example, when a product has been delivered to a location such as a building and is entered into CLAM tool 20 via the goods-in process, the product may become available for deployment and is classified as in stock. In one embodiment, unfulfilled requests trigger automatic allocation of stock for deployment in order to fulfill the request, which may include notifying an implementation team where to commission the stock items.

As an example, if a quantity of equipment that is not being used is discovered, it may be possible to enter information about this equipment into CLAM tool 20 through the goods-in process. When an order is made using CLAM tool 20, CLAM tool 20 may check available stock to ensure that an order is not placed for product or items that are already available.

In one embodiment, monitoring what is in stock and what has been deployed is referred to as stock control. Stock control may provide a valuable accounting process, helping to account for substantially all purchases of products or other items. Without the stock control process, equipment might be lost, stolen, or otherwise unaccounted for, without anyone knowing about it.

vi. Goods Movement

Goods movement may include the ability to move products between locations such as buildings and stock holding areas such as work areas. In one embodiment, CLAM tool 20 may store stock holding information for each location, and if a product is requested that is not in stock, an order may be placed. If another location is over-stocked on a particular product, stock redistribution may be desired between or among locations. CLAM tool 20 may allow products to be moved from location-to-location using the goods-in and goods-out processes, for example.

a. Goods-In

The goods-in process may register quantities of deployable products or other items and the locations where the products are being stored. The registration may be completed using a delivery note, goods movement ticket, or other suitable document.

b. Goods-Out

The goods-out process may register removal of products or other items from stock. For example, the goods-out process may prevent attempts to deploy products or other items that have already been deployed by removing those products or items from stock. The registration may be completed using a returns note, goods movement ticket, or other suitable document.

The goods-in and goods-out processes may provide an auditable trail of product movement between or among locations. In one embodiment, CLAM tool 20 records the date and time when a product or other item is registered in or registered out and the user who registered the product or other item in or out.

B. Site Mapping i. Site Profile

In one embodiment, CLAM tool 20 maintains a site profile for one or more sites of the enterprise. A site may include a collection of locations such as buildings within a enterprise's infrastructure. The site profile may include a site name, which may include a text string, for example. The site profile may include buildings within an enterprise's physical infrastructure that are associated with the site. The site profile may include one or more site rules, which may be associated with a site. Buildings within the site may be required to comply with these rules.

ii. Building Profile

In one embodiment, CLAM tool 20 maintains a building profile for one or more buildings with an enterprise. A building may include a business premise from which a company operates or other suitable location. In one embodiment, before CLAM tool 20 may allow products or services to be deployed to a particular building, a building profile for the particular building must be created. A business profile may include the physical address of the building and one or more work areas that are subdivisions of the building (e.g., rooms, areas, and zones for each floor of the building). Building profiles may include entry procedure information for accessing a building and directional information for navigating to and around the building. Maintaining building profiles help identify where products and services will reside.

As an example, a building profile may include the following information:

Building Details: Building details may include the name and address of a building, the main switchboard and fax numbers, the floors of the building (possibly both above ground and below ground floors), or any other suitable information.

Contacts: Contacts may include one or more persons who may be specified as a contact for the building. Contacts may include a members of staff, service provider (e.g., from a security firm associated with the building), or any other suitable person.

Access Details: Access details may include certain dates and times for the building, including opening hours, after-hours access, standard working hours, restricted periods, lunch breaks, busy periods, break periods, building closure dates, or any other suitable dates or times. In one embodiment, notes may be entered for each activity specified.

Security Details: Security details may include security measures for the building, security guards, access card information, key code information, or any other suitable security information. In one embodiment, security measures may be stored for the building, for one or more work areas of the building, or for any other suitable access point associated with the building.

Restrictions: Restrictions may include physical size dimensions of the building that may hinder or otherwise affect deployment of products or services to the building. This may include height and width of doors and elevators, weight restrictions of elevators, the length of the building's loading dock, or any other suitable restrictions.

Delivery Address: The delivery address may include the address to which equipment may be delivered, which may be different from the main building address.

Parking: Parking information may include information relating to the number of available parking spaces whether booking is required.

iii. Work Area Profile

In one embodiment, CLAM tool 20 includes a work area profile for one or more work areas associated with a building. To facilitate navigation through a building, the building may be divided into a number of smaller units known as work areas. A work area may include a subdivision within a building where information technology may be located. In one embodiment, a work area profile includes a work area name and a floor number, if appropriate. The work area name may refer to a room name or room number, an open plan area name like "Accounts," a zone such as warehouse, or any other suitable designation. A work area name may be well known to people who work in or around the building. A work area may be associated with other names, which may offer more specific room information, such as "Training Room" or "Communications Room," and the work area profile may include these additional names for a work area. A work area profile may include details relating to access hours for the work area, security issues relating to the work area, logistical restrictions of the work area, contacts associated with the work area, or any other suitable information.

iv. Location Point

A location point may include a reference that uniquely identifies a specific workplace within a work area such as a desk. As an example, within a work area of a building, a location point may refer to a physical place where products and services are or may be deployed. The location point may include a desk reference, a phone extension, a floor grid reference, or other suitable information. The location point may be used within CLAM tool 20 to identify where members of staff and/or products and services may be physically located.

V. Facilities Management

Facilities management may include management of building resources within a particular building. Facilities management may be used for tracking purposes and for reducing or eliminating double-booking errors. Within CLAM tool 20, facilities management may be divided into two fundamental elements—work area management and equipment management.

a. Work Area Management

Work area management may include a process for identifying physical areas within a building that can be reserved or otherwise booked to a schedule. The work area management process may be linked to a schedule, which may allow users to review or book a particular work area for meetings or for other suitable purposes. Providing this schedule may reduce or eliminate date conflicts and help identify where overlapping requirements may exist so that priorities may be reviewed.

b. Equipment Management

Equipment management may include a process for identifying equipment that can be loaned or temporarily booked out to a user. The work area management process may be linked to a schedule, which may allow users to request such equipment. The equipment management process may be able to locate available equipment within a particular building in response to a request, provide information on who has the equipment, provide information on where the equipment is currently located, or any other suitable information. This may provide an auditable trail of where equipment is, which may also help in recovering equipment that is overdue for return.

IV. IMAC

A. Adding Products or Services

CLAM tool 20 may include a process for adding products or services to a member of staff or a point of presence via groups and roles. For example, a member of staff or a point of presence may have products or services added to their respective profiles by subscribing to groups or roles. If appropriate, these products and services may then be set up on a location point where they are located. Two members of staff who share the same location point may not both be able to use all products and services assigned to that location point. In one embodiment, the groups and roles to which a member of staff subscribes controls access to the products and services for a location point.

B. Removing Products or Services

CLAM tool 20 may include a process for removing products or services from a member of staff or from a point of presence. For example, a product or service may be removed from a member of staff or a point of presence by removing the groups or roles associated with the product or service from the user profile of the member of staff or the point of presence. In one embodiment, the product or service is not removed from the location point, but rather that the group or role will be removed from the user profile that allowed the member of staff to access and use the product or service.

C. Office Moves

In one embodiment, an office move includes moving some or all products, services, groups, and roles from one place to another. CLAM tool 20 may allow equipment to be moved between work areas, location points, buildings, or any suitable combination thereof. For example, equipment may be moved within a building from a first work area to a second work area such that all products, services, groups, and roles associated with the first work area can be disassociated from the first work area and associated with the second work area. Moving between location points (e.g., moving from one desk to another desk) may be similarly performed, whether the move is within a work area, from one work area to another work area within a building, or from one building to another building. In one embodiment, it is not possible to disassociate all equipment within one building and associate the equipment with another building. In one embodiment, all products, services, groups, and roles associated with a building may be moved from one building to another only if each is associated with a work area.

V. Organization

A. Domains

A domain may include a container for segmenting common infrastructure. In one embodiment, a domain is a top-level placeholder or container within CLAM tool 20. The top-level placeholder may hold substantially all common infrastructure elements such as servers, workstations, groups, roles, members of staff, or other suitable elements. Multiple domains may be created and used to manage specific areas of an enterprise's infrastructure, which may ease management and establish rules for automating the deployment of information.

In one embodiment, similar to a group or a role, a domain within CLAM tool 20 may also be assigned products and services that are common to all of the deployed elements of the domain. This may eliminate the need to individually assign each member of staff or machine the same products or services. As an example, an enterprise may have forty thousand members of staff throughout the United Kingdom and may need to manage the northern and southern regions differently. In this example, two domains may be created named "North" and "South," and all elements of the enterprise could be divided into their respective geographic area.

B. Staff and Point of Presence Groups

A group may include a name provided to encompass a collection of products and services. In one embodiment, CLAM tool 20 may allow a descriptive word to be added to a list known as groups. This descriptive or group may be used as a container to hold another list of products and/or services. Creating this type of list may reduce or eliminate duplication when identifying shared functional needs of staff or machines.

i. Staff Group

A staff group may be a group created to identify technical functionality (e.g., products and services) that is common among members of staff. A staff group may differ from staff roles in that staff roles may be created to identify members of staff that have a specific job function or job title. As an example, an enterprise may have six hundred members of staff who all require the same basic PC and software, except for a few additions. In this example, a staff group may be created called "All Computer Users," for example, which may list all the products and services needed to ensure that the basic requirements are met. Additionally, other staff groups may be created to accommodate any special needs (i.e. the few additions). When each member of staff is assigned to the "All Computer Users" group, the member of staff may receive the products and services listed, which may eliminate the need to duplicate the same list for each member of staff.

ii. Point Of Presence (POP) Group

A POP group may be a group created to identify lists of products and services that are commonly deployed without regard to particular members of staff. A POP group may differ from a machine role, which may be used to identify hardware that has a specific job function. As an example, an enterprise may require a number of training PCs. Within CLAM tool 20, a POP group called "Training PCs," for example, may be created, and relevant products and services may be listed within the Training PCs group. The list may specify the location where each training PC is required, which may allow the relevant products and services to be deployed to the locations without the need to list products and services for each individual location.

iii. Global and Local Groups

In one embodiment, staff and POP groups may each be divided into global and local groups such as global staff groups and local staff groups and global POP groups and local POP groups. A global group may include a group whose members are comprehensive across an entire enterprise. A local group may include a group that is limited to a specific building, for example. Further subdividing staff and POP groups in this manner may provide simplistic viewing and management of groups that are dispersed across a large enterprise, particularly when similar group names may differ in functionality.

As an example, an "Employee Cooperative" staff group that needs access to certain services may exist at an enterprise's headquarters. The Employee Cooperative staff group may only exist at the enterprise's headquarters, so this staff group may be considered a local staff group.

C. Staff and Machine Roles

A role may include a name associated with a specific job function or work activity. CLAM tool 20 may include a list known as "Roles" to which a descriptive word, phrase, or other information can be added to describe roles within an enterprise. This descriptive or role may be used as a container to hold another list of products and/or services, which may reduce or eliminate duplication when identifying the shared functional needs of either members of staff or machines that have a common job function.

i. Staff Role

A staff role may include a role that identifies members of staff that have a specific job function or job title. A staff role may differ from a staff group in that a staff group may collate members of staff that have generic technical functionality in common. As an example, an enterprise may include a payroll department with five payroll clerks. In this example, because each clerk may need access to a payroll database, a staff role named "Payroll Clerk" may be added to CLAM tool 20. The "Payroll Clerk" role may be assigned a number of products and services, which may provide each payroll clerk with access to the payroll database. The staff role feature may reduce or eliminate the need to individually assign each of the five clerks to the same products and services, possibly reducing duplication of data and effort.

ii. Machine Role

A machine role may include a role that identifies hardware that has a specific job function. A machine role may differ from a POP group in that a POP group may collate machines that have generic technical functionality in common. As an example, an enterprise may include eight PCs that each controls swipe-card door access systems to each of their respective sites. In this example, a machine role may be added to CLAM tool 20 and called "Door Entry System." A number of products and services may be assigned to the Door Entry System role, each including the door access system only. The machine role may reduce or eliminate the need to individually assign each of the eight PCs the products and services, possibly reducing duplication of data and effort.

iii. Global and Local Roles

In one embodiment, staff and machine roles may each be divided into global and local groups such as global staff roles and local staff roles and global machine roles and local machine roles. A global role may include a role that is comprehensive across an entire enterprise. A local role may include a role that is limited to a specific building, for example. Further subdividing staff and machine roles in this manner may provide simplistic viewing and management of roles that are dispersed across a large enterprise, particularly when similar role names may differ in functionality. As an example, an "Accountant" in one building of an enterprise may be responsible for backing up a server; however, in all other buildings of the enterprise an "IT Administrator" may be responsible for performing this backup. In this example, a local staff role may be created for the Accountant, which may include the products and services needed to backup the server assigned to the Accountant. In addition, an "IT Assistant" global staff role may be created since there may be more than one IT assistant that carries out this function throughout other buildings.

D. Members of Staff

A member of staff may include an employee of an enterprise who requires products and services. To manage the infrastructure of an enterprise, it may be critical to understand the requirements of persons within the enterprise. In one embodiment, a purpose of CLAM tool 20 is to ensure that each member of staff has the appropriate products and services needed to execute the member of staffs duties and to manage the deployment of such products, services, and duties. Capturing details such as staff ID, name, contact details, employment status, or any other suitable details may help manage the deployment process, possibly ensuring that products and services are delivered only to those who need them.

In one embodiment, products and services are allocated to members of staff by associating each member of staff with one or more groups or roles at a given location point, which may be included in a member of staff profile for each member of staff. Member of staff profiles may help ensure that wherever a member of staff executes his duties, the member of staff has access to all products and services associated not only with his specific duty, but also various other products and services dependent on the location where the duties are executed. The ability to provide varying products and services at different locations may be referred to as a roaming profile or peripatetic user.

As an example, assume a marketing director is based in England, where he accesses all the financial systems for forecasting sales. However, every quarter the marketing director travels to New York to attend a sales briefing seminar. While in New York, the marketing director may require access to his email in England. Originally, the marketing director traveled with his laptop computer, but he now has his own office where has access to a PC. In this example, the marketing director may be given two profiles—one profile for when he is executing his duties in England and another for when he is executing his duties in New York.

E. Business Streams

A business stream may include a node or division that falls beneath an organizational structure of an enterprise. A business stream may identify collections of individuals who share a common geographic or business subdivision, for example. For example, CLAM tool 20 may capture and store such divisional elements to facilitate the identification of products and services that are unique to each subdivision. These subdivisions may be referred to as Business Streams or OU. Each member of staff may be assigned to one or more business streams and allocated the products and services associated with the one or more business streams. In one embodiment, products and services that are allocated to a business stream may not be cascaded down the infrastructure and may only be relevant to a nominated business stream node.

VI. Resourcing

A. Site Activities

A site activity may include an identifiable milestone for an activity that needs to be completed on site (i.e. at a location). A schedule of milestones may be created, which encompasses the activities for a site within the lifecycle of the site. The milestones may be offset against a time frame within which each activity needs to be completed. As an example, a site survey on a project schedule may be set against a twenty-week time frame, which means that a site is "going live" in twenty weeks. This means that within twenty weeks, all activities surrounding this milestone should be completed.

B. Site Activities Plan

A site activities plan may include a breakdown of the elements associated with a site activity. For example, as part of a particular milestone (e.g., site activity), a number of tasks may need to be completed and a number of resources may need to be deployed to complete these tasks. A site activity plan may be created, using a Gant chart for example, to pinpoint what tasks are required to complete a particular milestone within the lifecycle of the site. Job-specific roles may be associated with a site activities plan so that resources may be deployed to the site. Associating job-specific roles with the site activities plan may help ensure that the correct people arrive on site at the right time.

C. Skills Matrix

A skills matrix may include a list of skills that each person who has been categorized as a resource has acquired. The skills matrix may include all people available as a resource and may capture their associated skills and abilities so that the correct person or persons for a particular task can be assigned. For example, the skill matrix may help the resource team assign people with the right skill for a specific job or task. In one embodiment, the skills matrix is searchable, possibly including the ability to search for all people having a particular skill set or for those people within a particular team having the skill set.

D. Resource Teams

A resource team may include a collection of individuals with the skills required to complete a particular task. A resource team may be assembled to complete one or more site activities using the schedule, the skills matrix, and any other suitable sources, which may help ensure that the resource team includes enough skilled people to visit a site and fulfill the activities required by the site activity plan. Using the schedule and the skills matrix to assemble resource teams may also help establish, in advance, where a resource problem may occur, possibly with sufficient time to revise milestone dates and reschedule, if desired or appropriate.

E. Bank Holidays

CLAM tool 20 may include the ability to add bank holiday dates to one or more calendars associate with CLAM tool 20. In one embodiment, all calendars within CLAM tool 20 may be pre-populated with any suitable holidays associated with any suitable countries or collection of countries. However, bank holidays in certain countries may not fall on the same date each year, so CLAM tool 20 may include the ability to add these dates manually or in any other suitable manner. This may be useful, for example, if CLAM tool 20 is calculating a delivery date because CLAM tool 20 may be able to factor in the bank holidays as potentially unavailable delivery dates.

F. Security Clearance

Security clearance may include the ability to track which resources, such as personnel, have the appropriate, up-to-date security clearance. Security clearance may be useful when a resource team has to visit a secure site, such as a prison. Each member of a resource team may need to have security clearance. If certain members do not have security clearance, those members may need to go through extensive, costly, and time-consuming investigation. However, keeping a list of resources with security clearance enables personnel with the appropriate security clearance to be sent to the secure environment, possibly reducing or eliminating the need for additional personnel to acquire clearance. The list may also enable tracking of the need to renew security clearance for each person.

G. Projects

Projects may be subdivisions of an infrastructure refresh. Dividing an infrastructure refresh into smaller projects may ease management to management of the infrastructure refresh. A resource, including personnel or other resources, may also be identified as project specific, meaning that only that project can utilize the resource. In one embodiment, the projects of an infrastructure refresh may be prioritized, which allow the most important parts of the infrastructure refresh to be addressed first.

VII. Services

A. Product Catalog

A product catalog may include a combined list of products and services that are either in use or to be deployed. For example, the product catalog may include a list of computer hardware, computer software, services, or any other suitable products that an enterprise has or may employ. In one embodiment, each product or service is listed once along with relevant data such as make, model, part number, vendor, category, or any other suitable data.

In one embodiment, in order to prevent numerous connotations and spellings of products within the product catalog, a logistics team may be exclusively assigned the task of updating the product catalog. When an audit of existing products and services is being executed, it may be assumed that either the product catalog has sufficient entries or history, or that one or more trained individuals will make new entries for unlisted products or services.

In one embodiment, the product catalog includes the following classifications:

i. Approved Products

An approved product may include a product that may be ordered for deployment. CLAM tool 20 may include the ability to identify approved products, in the product catalog for example. Products not identified as approved products may be classified as superseded products or retired products as discussed below.

ii. Superseded Products

Superseded products may include products that have been superseded by another product. CLAM tool 20 may provide the ability to identify superceded products, in the product catalog for example. This may help ensure that if a superceded product is selected for deployment, a user is automatically advised that the product has been superseded and, if appropriate, that the new product should be selected.

iii. Retired Products

In one embodiment, any product not categorized as approved or superceded may be classified as a retired product.

iv. Solution Mapping

In one embodiment, all software products that have not been classified as approved products are considered by CLAM tool 20 to be in need of replacement. CLAM tool 20 may include the ability to collate all such software products to allow a migration path from one product to another product to be investigated. CLAM tool 20, using this investigative capability, may be able to identify a superseded product and the hardware that uses the superceded product.

B. Service List

A service list may include a list of generic products or services that can be enabled or disabled. A service may include an activity that requires the intervention of a third party to activate an installed product. In one embodiment, a product that can be installed or decommissioned is not considered a service. For example, a new computer that has been installed may not be considered a service. As another example, Internet software loaded on the new computer may not be considered a service. However, to enable the browser to connect to the Internet, a third party typically must be employed. While the browser itself may be a product, "enabling" the browser to access the Internet may be considered a service requirement and may appear in the service list as "Internet Access," for example. As another example, a gas cooker may be delivered and installed into a kitchen. This may not be considered a service. However, to use the gas cooker, the gas must first be turned on. This may be considered a service. In one embodiment, services may be assigned to groups and roles to allow for the simple identification of services that need to be enabled.

C. Categories

A category may include a name provided to associate a collection of products within the product catalog. Products within the product catalog may be subdivided into logical elements, creating a more specialized list for any particular product. This specialized list may be known as a category and may be used to collate products having similar functionality. Because a product catalog may include potentially thousands of products, using categories may ease product searching.

VIII. Topology

A. Business Rules

A business rule may include a preempted condition that results in the automatic allocation of an IP address, a DNS name, or any other suitable information. Business rules may be created to help ensure that network services are not compromised, when a new piece of equipment is connected to the network for example. In order to prevent an IP address or DNS name from being duplicated, a series of business rules may be created to manage the allocation of a unique address within a particular range. The range can be a single range or split into a number of ranges.

i. Domain Rules

In one embodiment, CLAM tool 20 includes domain rules as a top-level rule set. The domain rules may include a range of addresses, which can be reserved for one or more domains. Furthermore, a domain rule may be divided into equipment types, a different range being allocated to each equipment type. As an example, one hundred server addresses may be reserved in a specific range within a domain, and an additional ten thousand specific workstation addresses may be reserved in the same domain. This type of blanket reservation of addresses may help ensure that the addresses within the domain are freely available for equipment that may require topology addresses.

ii. Building Rules

In one embodiment, CLAM tool 20 includes building rules, which may function similarly to domain rules. Building rules may differ from domain rules in that the addresses a building rule can use may be limited to the range provided to its parent domain (i.e. the domain of which the building is a part). As an example, one domain rule may have multiple associated buildings. In this example, if ten thousand addresses are available in the domain rule, two building rules may be created with five thousand addresses each, the five thousand addresses falling within the domain range of the parent domain rule.

iii. Work Area Rules

In one embodiment, CLAM tool 20 includes work area rules, which may function similarly to domain rules and building rules. The addresses a work area rule can use may be limited to the range provided to its parent (i.e. the building in which the domain name exists). As an example, if five thousand addresses are available within a building rule, one thousand addresses may be allocated to five different work area rules.

In one embodiment, domain area rules, building rules, and work area rules may each be subdivided into equipment-type rules. However, in one embodiment, for a work area rule to exist, a building rule must first be created, and for a building rule to exist, a domain rule must be created. This nested collection of rules may facilitate an improved representation of a physical estate, including where addresses may be used to identify the physical location of equipment while planning the routing of TCP/IP network data or other suitable protocols.

In one embodiment, CLAM tool 20 may include IP reservation functionality, which may allow further complexity to be added to the business rules by blocking or reserving specific addresses within a particular range. The IP reservation functionality may also be used to block an allocation of legacy addresses that fall within a large range as free addresses.

B. Build Keys

A build key may include a unique identifier and check-sum that may be used to deploy services. A build key may be an algorithm that, in one embodiment, includes either a combination of the IP address, domain number, and another offset or a domain number, DNS name information, and an offset. A build key may be used during a hardware deployment process to help ensure that the right services are deployed to the intended recipient. In one embodiment, CLAM tool 20 includes functionality of a "genstring" class to automatically generation of build keys.

C. DNS Names

A DNS name may include a unique label or name associated with a piece of networked equipment. The DNS name may be in any suitable language according to particular needs. This is different from the four octets of an IP address, which may be more difficult to remember. In one embodiment, DNS names begin with an alphanumeric prefix followed by a number. Similar to an IP address, rules may be used to manage the automatic allocation of DNS names, and CLAM tool 20 may increment the number portion of the DNS address so that each new DNS name is unique. CLAM tool 20 may help ensure that any allocated DNS name falls within the range specified by the rules. In one embodiment, CLAM tool 20 may offer different ranges, prefixes, and numbers for the DNS names for different types of equipment. As an example, a workstation may have a prefix of "WS," and a server may have a prefix of "SVR."

In one embodiment, a DNS name may include one or more domain rules, building rules, and work area rules. For each of the domain rules, building rules, and work area rules, further rules may be included based on the type of equipment to which the DNS name will be assigned such as a server, workstation, printer, communications. CLAM tool 20 may allow a suffix to be added to a DNS name for any suitable purpose.

D. IP Addresses

An IP address may include a four-octet number, which is separated by decimal points and used as a unique network identifier by the TCP/IP networking protocol. Each deployed item of networked equipment may require a unique IP address. Each IP address may need to be consistent with the environment within which the IP address is deployed because, for example, two pieces of equipment having the same IP address may prevent data from being communicated.

In one embodiment, CLAM tool 20 uses one or more rules to automatically allocate IP addresses. The rules may help ensure that each item of networked equipment is given a unique IP address and that the IP address is appropriate within the environment in which the equipment is deployed. In one embodiment, IP address rules include the following:

i. Domain Rule

A domain rule may define an IP address range for a domain that defines a starting address and an ending address for the domain. In one embodiment, the domain rule requires that equipment used within a particular domain has an IP addresses that is within the IP address range for the particular domain.

ii. Building Rule

A building rule may define an IP address range for a building that defines a starting address and an ending address for the building. Buildings may be given an IP address range to help support personnel identify where equipment resides and to help the TCP/IP protocol route data quickly. In one embodiment, the IP address range associated with a building rule must be within the IP address range associated with the domain rule of the domain in which the building exists.

iii. Work Area Rule

A work area rule may define an IP address range for a work area that defines a starting address and an ending address for the work area. Work areas may be given an IP address range to help divide large establishments into smaller segments that are more manageable. In one embodiment, the IP address range associated with a work area rule must be within the IP address range associated with the building rule of the building in which the work area exists. In one embodiment, CLAM tool 20 may allow reservation of a batch of addresses outside a rule to prevent duplication of IP addresses. This reservation functionality may be useful when deploying equipment to an existing environment where other network equipment already exists that has not been captured or maintained within CLAM tool 20.

IX. Workflow

A. Service Management i. Incidents

An incident may include a request to either effect change or resolve a problem. Incidents may be at the core of a workflow within CLAM tool 20. In one embodiment, when a request for a service is made, an incident is created, which may enable tracking of the request. Each incident may be assigned priorities and delegated to either specific teams or individuals. In one embodiment, incidents may be used for problem reporting such as when a problem resolution is required that does not fall under the category of a service request.

a. Incident History

An incident history may be maintained in CLAM tool 20. The incident history may include text that may be updated and provides an auditable trail of how an incident has been handled and by whom. The incident history may include date and time information for each entry. Once an incident is completed, the incident history may include an indication that the incident is closed.

b. Color Coding Incidents

CLAM tool 20 may include the ability to color code incidents. In one embodiment, new incidents are shown in green, approaching incidents are shown in orange, and overdue incidents are shown in red. While these particular colors and subdivisions of incidents are described, the present invention contemplates using any suitable subdivision and associated colors to describe incidents. The color-coding may be based on the "required by" or other due date for an incident.

c. SLAs

In one embodiment, each incident has a due date. The due date may be entered manually or automatically calculated by an SLA to which the incident is referenced. CLAM tool 20 may include information such as hours of cover, call-to-fix times, bank holidays, other holidays, or any other suitable information, which may enable CLAM tool 20 to effectively calculate the due date for resolving an incident.

d. Service Managers

Incidents may be managed by service managers, which may include individuals who are responsible for reviewing incidents and deciding to which SLA the incident should be referenced. Service managers may also assess the priority of an incident and to whom the incident should be assigned. Using certain functionality provided by CLAM tool 20, a service manager may review open, closed, or suspended incidents, including reviewing incidents for a particular building. This flexibility may enable tracking of tasks and procedures, which may otherwise remain unseen by appropriate personnel.

ii. Escalations

An escalation may include the notification to a peer of an action or activity that has not been completed within an allotted time frame (i.e. an overdue action or activity). For example, an escalation may occur when a step within an SLA has not been completed within the allotted time frame. This overdue action or activity may be referred to as non-conformance and may trigger the sending of an email or other suitable notification to one or more predetermined individuals. Each step within an SLA may have an allotted time and a predetermined escalation email address, for example.

The SLA functions within CLAM tool 20 may provide a mechanism for entering time-specific procedures. However, under certain circumstances, varying processes may be followed. CLAM tool 20 may facilitate one or more decision criteria for each step within an SLA. For example, if one outcome is true based on a decision criterion, then the procedure will be followed. If the outcome is false based on the decision criterion, then the procedure may skip several steps and follow a different criterion. In one embodiment, the decision process may be customized to suit each SLA such that varying questions may be asked at each step and varying answers may be given.

As an example, assume a member of staff reports that his PC is no longer working. This may be an incident. The PC may be associated with a default SLA, which is associated with a particular vendor. If the member of staffs PC is new, the vendor may have an obligation to replace the PC within forty-eight hours or some other suitable time frame. However, if the member of staffs PC is older than twenty days, for example, then the PC may fall under a support agreement with the vendor, which provides that the PC should be replaced within eight hours, for example. In this example, a decision criterion within the SLA may include whether the equipment is less than twenty days old. If the outcome is true, then next decision criterion may be whether the vendor replaced the PC within twenty-four hours. If the outcome is false to the first decision criterion, then next decision criterion may be whether the vendor replaced the PC within eight hours. As can be seen in this example, each incident may be assigned to an SLA, and if certain steps within the SLA are not completed in time, an escalation may automatically be sent via email or otherwise.

iii. Personal follow-ups

Personal follow-ups may allow an individual to view incidents and reminders allocated to the individual's workflow. A personal follow-up screen may include information regarding tasks an individual needs to perform for a particular incident. The personal follow-up screen may be used by an individual as an electronic notepad, which may allow the individual to record information and may provide a central location where the individual can place reminders of tasks that need to be completed.

As an example, an installation engineer may visit a site and install a piece of equipment. While the installation engineer was at the site, she also fixed another problem at the site that had not yet been raised within CLAM tool 20. The installation engineer may need to record this additional fixed problem when she returns to her office, for example. However, assume that the installation engineer is on vacation for two weeks beginning the end of the day of the site visit. The installation engineer may be able to use a computer at the site, which has access to CLAM tool 20, to add this information into the installation engineer's personal follow-up screen so that she does not forget what she needs to do regarding this additional fixed problem. This may provide a reminder to the installation engineer when she returns from vacation in two weeks.

iv. Team Follow-Ups

Team follow-ups may allow an individual to view incidents and reminders associated with a team to which the individual is subscribed. The individual may be able to view this information by individual teams or view a complete list of incidents and reminders combined for all teams to which the individual is subscribed. A team follow-up screen may include information regarding tasks a team needs to perform for particular incidents. A team follow-up screen may include one or more reminders to contact a site on a particular date at a specific time and an indication of the reason for the contact. As an example, assume there is a reminder for a team to contact a site. An individual may be able to assign this reminder as a personal follow-up item such that only the individual to which the contact task is assigned will view the reminder. This may reduce or eliminate situations in which several team members see the reminder in the team follow-ups and each contact the site separately.

V. Service Providers a. Contracts

A contract may include an Agreement that has a start date and an end date and which is agreed to between two or more parties. Within CLAM tool 20, a contract may refer to a support contract between an enterprise and a service provider. CLAM tool 20 may provide the ability to capture the start date and end date of contracts, which may allow individuals to easily determine whether a particular contract has expired. CLAM tool 20 may also allow contract details to be input, which may allow an SLA to be assigned to a service provider associated with the contract.

b. SLAs

An SLA may include one or more steps and/or procedures that are tied to one or more service providers for the purpose of getting from one point to another point. The one or more steps and/or procedures of an SLA may be driven by actions taken on a previous step or procedure. Each action may flow to a different step or procedure. For example, when an issue or request is entered into CLAM tool 20, CLAM tool 20 may refer to the appropriate SLA for the appropriate process and complete the actions required.

B. Work Handling i. Drop Sheets

A drop sheet may be a report including information required to commission a piece of equipment. Drops sheets may be used to produce a report on desk-specific low-level configuration details that are needed to commission a piece of equipment on site. For example, the report may include the desk number of the desk to which the equipment being deployed, the build key of the piece of equipment, the IP address of the piece of equipment, if applicable, the DNS name of the equipment, if applicable, or any other suitable information. The information in the report may help improve the accuracy of the individuals deploying, possibly minimizing human error.

ii. Low-Level Configuration

Low-level configuration may include a reporting system for capturing details of users and services. For example, low-level configuration may provide information regarding technology-specific details and addresses of a user and services associated with the user. The information may include the desk location, phone extension user number, a list of services associated with the user, DNS name of services associated with the user, IP address of services associated with the user, or any other suitable information.

iii. UAT

UAT may include a report regarding whether equipment and any addresses assigned to that equipment have been properly deployed. The report may include information captured during delivery and installation of a piece of equipment. The information in the report may include where each piece of equipment has been deployed, any addresses associated with each piece of equipment, or any other suitable information. Using this report, some or all details pertaining to a piece of equipment may be studied to help ensure that the equipment has been deployed to the right place and has been assigned the correct addresses. The report may also allow errors in deployment to be flagged quickly so that appropriate action may be taken more quickly. Drop sheets may be created along with this report to help an installation team to correctly deploy and configure each piece of equipment.

Figure 4:
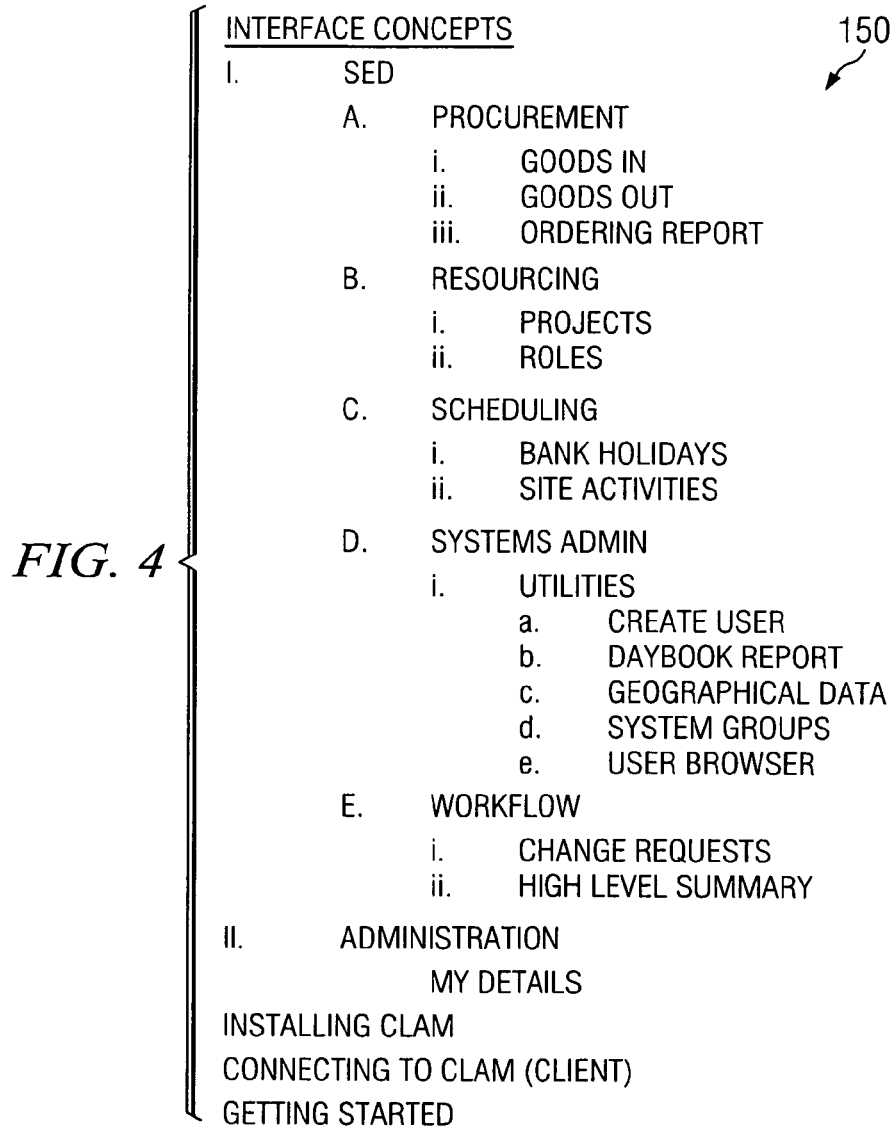
FIG. 4 illustrates an example logical arrangement of example CLAM interface concepts.

FIG. 4 illustrates an example logical arrangement of example CLAM interface concepts 150. CLAM interface concepts 150 may be useful in developing an interface for CLAM tool 20. The content and arrangement of interface concepts 150 illustrated in FIG. 4 merely represent a non-limiting example. Interface concepts 150 illustrated may not be required and others not listed may be included and still fall within the spirit and scope of the present invention. In one embodiment, interface concepts 150 are customizable, for example, for particular enterprises, for enterprises within a particular industry, or in any other suitable manner. Example interface concepts 150 are described in more detail below.

I. Service Enablement and Deployment (SED)

A. Procurement i. Goods Maintenance—Goods-in

The purpose of the goods-in interface concept 150 may be to create "goods-in" records. To arrive at this page for the purpose of creating a "goods-in" record, the following link may be used:

Root\SED\Procurement\Goods In.

In one embodiment, there is one tab, "Goods," associated with this page. Example details of the "Goods" tab are as follows:

Goods

In one embodiment, there are eleven fields and five buttons associated with this tab, which are as follows:

Vendor:

This field shows the Service Provider of the goods being recorded. In one embodiment, this information cannot be input manually. There is a "?" button to the right of this field which may be pressed. Once this button is pressed, the "Service Provider Locator" pop-up page may appear. Once used successfully the Service Provider's name may be automatically input into this field.

Delivery Note:

The delivery note details may be entered in this field.

Product Name:

The product name may be entered in this field. If the product name is incorrect when the next field is selected or the "Tab" key pressed, the "Product Locator" pop-up page may automatically be initialized.

Description:

If the correct product name was input into the previous field, a description of that product may automatically appear in this field. In one embodiment, the details in this field may not be manually edited.

Quantity Delivered:

The quantity of what is going in may be entered in this field.

Building:

This field may show the building with which the goods are associated. In one embodiment, this field may not be manually edited. To populate this field the "?" button to the right of this field may be pressed. This button may bring up the "Building Locator" pop-up page. Once used successfully the Building Name may appear in this field.

Work Area:

This field may show the work area with which the goods are associated. In one embodiment, this field may not be manually edited. To populate this field the "?" button to the right of this field may be pressed. This button may bring up the "Work Area Locator" pop-up page. Once used successfully, the Work Area Name may appear in this field. In one embodiment, a "Building" may be selected before this field can be populated.

Location Point:

This field may show the location point with which the goods are associated. In one embodiment, this field may not be manually edited. To populate this field the "?" button to the right of this field may be pressed. This button may bring up the "Location Point Locator" pop-up page. Once used successfully the Location Point Name may appear in this field. In one embodiment, a "Work Area" may be selected before this field can be populated.

Date Of Delivery:

The delivery date may be recorded in this field.

Notes:

Any additional notes can be entered into this field.

Save:

In one embodiment, this button may only be used successfully if all mandatory fields are populated. Once this button is saved the page may be refreshed. The following fields may retain information from the previous record: Vendor, Delivery Note, Building, Work Area, Location Point, Date Of delivery.

ii. Goods Maintenance—Goods-Out

The purpose of the goods-out interface concept 150 may be to create "goods-out" records. To arrive at this page for the purpose of creating a "goods-out" record, the following link may be used:

Root\SED\Procurement\Goods-Out.

In one embodiment, there is one tab, "Goods," associated with this page. Example details of the goods tab are as follows:

Goods

In one embodiment, there are eleven fields and five buttons associated with this tab, which are as follows:

Vendor:

This field shows the Service Provider of the goods being recorded. In one embodiment, this information cannot be input manually. There is a "?" button to the right of this field which may be pressed. Once this button is pressed, the "Service Provider Locator" pop-up page may appear. Once used successfully the Service Provider's name may be automatically input into this field.

Delivery Note:

The delivery note details may be entered in this field.

Product Name:

The product name may be entered in this field. If the product name is incorrect when the next field is selected or the "Tab" key pressed, the "Product Locator" pop-up page may automatically be initialized.

Description:

If the correct product name was input into the previous field, a description of that product may automatically appear in this field. In one embodiment, the details in this field may not be manually edited.

Quantity Delivered:

The quantity of what is going out may be entered in this field.

Building:

This field may show the building with which the goods are associated. In one embodiment, this field may not be manually edited. To populate this field the "?" button to the right of this field may be pressed. This button may bring up the "Building Locator" pop-up page. Once used successfully the Building Name may appear in this field.

Work Area:

This field may show the work area with which the goods are associated. In one embodiment, this field may not be manually edited. To populate this field the "?" button to the right of this field may be pressed. This button may bring up the "Work Area Locator" pop-up page. Once used successfully, the Work Area Name may appear in this field. In one embodiment, a "Building" may be selected before this field can be populated.

Location Point:

This field may show the location point with which the goods are associated. In one embodiment, this field may not be manually edited. To populate this field the "?" button to the right of this field may be pressed. This button may bring up the "Location Point Locator" pop-up page. Once used successfully the Location Point Name may appear in this field. In one embodiment, a "Work Area" may be selected before this field can be populated.

Date Of Delivery:

The delivery date may be recorded in this field.

Notes:

Any additional notes can be entered into this field.

Save:

In one embodiment, this button may only be used successfully if all mandatory fields are populated. Once this button is saved the page may be refreshed. The following fields may retain information from the previous record: Vendor, Delivery Note, Building, Work Area, Location Point, Date Of delivery.

iii. PDF Report Generator

The purpose of the PDF report generator interface concept 150 may be to create one or more reports based on chosen report criteria. There may be a number of ways to get to this page for the creation of a report. Depending on what report is required, the following links may be used:

Root\SED\Procurement\Ordering Report;
Root\SED\System Admin\Utilities\Daybook Report;
Root\SED\Work Flow\Change Requests;
Root\SED\Work Flow\High Level Summary;
Root\Estate\Assets\Asset Report;
Root\Estates\Buildings\Address Report, and
Root\Estates\Buildings\Logistics Report.

In one embodiment, the report page is one form, "Report Generator," with no tabs. The details of the Report Generator form may be as follows:

Report Generator

In one embodiment, there are two fields and one button associated with this report form. Because this page may be accessible from a number of links, the report criteria required in the fields on this page may vary. The following links apply to the report criteria detailed below:

Root\SED\Procurement\Ordering Report; and
Root\SED\System Admin\Utilities\Daybook Report.

Date Start:

The date from which the report should start from may be entered in this field.

Date End:

The date when the report should finish at is entered here.

Generate:

In one embodiment, this button may only be used successfully when valid data has been entered into both fields. Once pressed a period of time may elapse. This time may be based on the amount of data that is being transferred into the report document. After this undefined period, a download box may appear with four options, including—Open, Save, Cancel, More Info. If the report is still required, the "open" or "save" button may be activated. The "more info" button may link to a browser help file. The "cancel" button may cancel the operation. If the "save" button is pressed, the "save as" box may appear. This may provide an option for where to save the zip file and what to call it. After this information is entered, the "save" button on this pop-up box may be pressed. Once the save button is pressed, the file may be downloaded and the "save as" box may disappear leaving the "download" box viewable. The "open" button may do one of two things. If pressed after the "save" button, the open button may open the file on the computer to which it was saved. If however the "save" button has not been pressed, the file may still be opened from the local computer; however, the file may only be there temporarily and may disappear after use unless the file is saved after being opened. Either way an application that can read "Zip" files may be required to access this file. The report may be then accessible from within this zip file, and is saved as a PDF file. The information and format of this PDF file may be dependent on the report criteria.

The following links may apply to the report criteria detailed below:

Root\SED\Work Flow\Change Requests;
Root\SED\Work Flow\High Level Summary;
Root\Estates\Assets\Asset Report;
Root\Estates\Buildings\Address Report; and
Root\Estates\Buildings\Logistics Report.

Building Name Start:

The Building Name where the report should start may be entered in this field. For example—"Apley Plaza."

Building Name End:

The Building Name where the report should stop may be entered in this field. For example—"Zenko Complex."

Generate:

In one embodiment, this button may only be used successfully when valid data has been entered into both fields. Once pressed, a period of time may elapse. This time may be based on the amount of data that is being transferred into the report document. After this undefined period, a download box may appear with four options including Open, Save, Cancel, More Info. If the report is still required, the "open" or "save" button may be activated. The "more info" button may link to the browser help file. The "cancel" button may cancel the operation. If the "save" button is pressed, the "save as" box may appear, providing the option of where to save the zip file and what to call it. After this information is decided, the "save" button on this pop-up box may be pressed. Once the save button is pressed, the file may be downloaded and the "save as" box may disappear leaving the "download" box viewable. The "open" button may do one of two things. If pressed after the "save" button, this button may open the file on the computer to which it was saved. If however the "save" button has not been pressed, the file may still be opened from the local computer; however, the file may only be there temporarily and may disappear after use unless the file is saved after being opened. Either way an application that can read "Zip" files may be required to access this file. The report may then be accessible from within this zip file, and may be saved as a PDF file that requires ADOBE ACROBAT READER or the full version to view. The information and format of this PDF file is dependent on the report criteria.

B. Resourcing i. Project Maintenance

The purpose of the project maintenance interface concept 150 may be to add edit or delete projects. To access this page for the purpose of creating, editing or deleting a project, the following path may be used:

Root\SED\Resourcing\Projects.

In one embodiment, there are three tabs associated with this page, the details of which are as follows:

Project List

In one embodiment, this tab may include an information area and three buttons, the details of each are as follows:

Project Names:

This information area may provide a list of projects already created within CLAM tool 20. Each project on this list may be selected.

Add:

This button may be used when adding a new project. When pressed, the user may be redirected to the "Detail" tab.

Edit:

In one embodiment, this button may only be pressed if a project already exists. The project may be selected and this button may be pressed. The user may be redirected to the "Detail" tab.

Delete:

In one embodiment, this button may only be pressed if a project already exists. The project may be selected and this button may be pressed. The project may be deleted from the "Projects" list. A successful deletion may take place once all assigned teams have been unassigned.

Detail

This tab may be accessible when either the "Add" button has been pressed or a Project is selected and the "Edit" button has been pressed under the "Project List" tab. There may be five fields and one button associated with this tab; these are as follows:

Project ID:

This may be a unique identifier generated by CLAM tool 20. In one embodiment, this field may not be edited.

Project Name:

The name of the project may be entered in this field. In one embodiment, only alphanumeric characters may be entered.

DNS Name:

The DNS name of the project may be entered in this field.

User ID:

A user ID may be entered in this field so that with a password only the person with these details can access this project's information.

Password:

A password may be entered in this field to go along with the user ID as part of a security measure. In one embodiment, a password may only be entered once a user ID is defined. In one embodiment, only alphanumeric characters may be entered in this field.

Save:

In one embodiment, this button may only be used successfully when the "Project Name" field has been completed. After this button is used, the user may be redirected back to the "Project List" tab and the project that has been created or edited may now be viewable under the "Project Name" list.

Membership

In one embodiment, this tab may only be accessed when a project is selected from the "Project List" tab and the edit button is pressed. The edit button may not take the user directly to this tab, but the user may have the ability to navigate to this tab from the "Detail" tab. This tab may have two information areas and two buttons associated with it; these are as follows.

Unassigned Teams:

This information field may show a list of teams that are currently not associated with the project. Each entry may be selectable.

Assigned Teams:

This information field may show a list of teams that are associated with the project. Each entry may be selectable.

Subscribe:

In one embodiment, this button may be pressed once a team name has been selected from under the "Unassigned Team" information area. Pressing this button may move the team name to the "Assigned Team" information area.

Unsubscribe:

In one embodiment, this button may be pressed once a team name has been selected from under the "Assigned Team" information area. Pressing this button may move the team name to the "Unassigned Team" information area.

ii. Resource Role Maintenance

The purpose of the resource role maintenance interface concept 150 may be to add, edit, or delete resource roles. To access this page for the purpose of creating, editing, or deleting a Resource Role, the following path may be used:

Root\SED\Resourcing\Roles.

In one embodiment, there are three tabs associated with this page, the details of which are as follows:

User Roles

In one embodiment, this tab may include an information area and three buttons associated; the details of which are as follows:

Current Roles:

This information area may provide a list of resource roles already created within CLAM tool 20. Each resource role on this list may be selected.

Add:

This button may be used when adding a new resource role. When pressed, the user may be redirected to the "Details" tab.

Edit:

In one embodiment, this button may only be pressed if a resource role already exists. The resource role may be selected, and this button may be pressed. The user may be redirected to the "Details" tab.

Delete:

In one embodiment this button may only be pressed if a resource role already exists. The resource role may be selected, and this button may be pressed. The resource role may be deleted from the "Resource Roles" list. A successful deletion may only take place once all assigned enterprises have been unassigned.

Details

This tab may be accessible when either the "Add" button has been pressed or a resource role is selected and the "Edit" button has been pressed from under the "User Roles" tab. There may be two fields and one button associated with this tab; these are as follows:

Role ID:

This may include a unique identifier generated by CLAM tool 20. In one embodiment, this field cannot be edited.

Role Name:

The name of the resource role may be entered in this field. In one embodiment, only alphanumeric characters may be entered.

Save:

In one embodiment, this button may only be used successfully when the "Role Name" fields have been completed. After this button is used, the user may be redirected back to the "User Roles" tab and the Resource Role that has been created or edited may now be viewable under the "Current Roles" list.

Assign

In one embodiment, this tab may only be accessed when a resource role is selected from the "User Roles" tab and the edit button is pressed. The edit button may not take the user directly to this tab, but the user may have the ability to navigate there from the "Details" tab. This tab may have two information areas and two buttons associated with it; these are as follows:

Assign Role To:

This information field may show a list of enterprises that are not currently associated with the resource role. Each entry may be selectable.

Unassign Role From:

This information field may show a list of enterprises that are associated with the resource role. Each entry may be selectable.

Unassign:

This button may be pressed once an enterprise has been selected from under the "Un-assign Role From" information area. The selected enterprise may be moved to the "Assign Role To" information area by pressing this button.

Assign:

This button may be pressed once an enterprise has been selected from under the "Assign Role To" information area. The selected enterprise may be moved to the "Un-assign Role From" information area by pressing this button.

C. Scheduling i. Bank Holiday Matrix

The purpose of the bank holiday matrix interface concept 18 may be to create, modify, and delete bank holiday collections. To arrive at this page for the purpose of setting up a bank holiday collection, the following link may be used:

Root\SED\Scheduling\Bank Holidays.

In one embodiment, there are three tabs associated with this page, the details of which are as follows:

Calendar

In one embodiment, there are two information areas and four buttons associated with this tab; these are as follows:

Country Selection:

This information area may show a list of countries in a table format already created within CLAM tool 20. Each entry may be selectable.

Calendar:

This information area may show a calendar with one month showing, for example. The current month and date may be is viewable when a country has been selected and the select button pressed. Each date on the calendar may be is selectable, and when selected, the page may redirect the user to the "Details" tab. There may be two arrows at the top of the calendar providing the ability to go backwards and forwards through the months.

Add:

This button may be used to create a new country. When pressed, the page may redirect the user to the "Details" tab.

Edit:

This button may be used when a country already exists. A country may be then selected from the "Country Selection" table, and this button may be pressed. Once pressed, the page may redirect to the "Details" tab.

Delete:

This button may be used to delete a country that has already been created. A country may be selected from the "Country Selection" table and this button may be pressed. If successful, a popup box may appear with the following statement "Delete Successful." The country may disappear from the "Country Selection" table.

Select:

To use this function, a country may be selected and this button may be pressed. Once pressed, the calendar for the selected country may appear under the "Calendar" information area. If successful, the title of this information area may change to show the name of the country selected.

Details

In one embodiment, there are two different formats for this tab. Table below describes what is viewable when the "Add" or "Edit" button is pressed from under the "Calendar" tab. Table below describes instructions what is viewable when a calendar date is selected.

Table 1:

The following details may appear when the "Add" or "Edit" button is pressed from the "Calendar" tab. Two text fields and one button may be associated with this tab; these are as follows:

Country ID:

This field may be populated with a randomly generated ID; this field may not editable.

Country Name:

The new country's name may be input in this field.

Save:

This button may be used when the "Country Name" field is populated. Once pressed, the page may redirect the user to the "Calendar" tab, and the new country may be added to the "Country Selection" table.

Table 2:

The following details may appear when a date is selected from the monthly calendar which is located under the "Calendar" tab. Two text fields and two buttons may be associated with this tab; these are as follows:

Bank Holiday Date:

The date that was selected from the monthly calendar under the "Calendar" tab may be recorded in this field. This field may not be editable.

Bank Holiday Name:

The name of the bank holiday being created may be inserted in this field.

Save:

This button may be used when the "Bank Holiday Name" field is populated. Once pressed, the page may redirect the user to the "Assignment" tab. To Remove:

This button may be used when a bank holiday record is already in existence. A date that already has a bank holiday may be assigned to it may be selected from the monthly calendar from under the "Calendar" tab. The page may redirect the user to the "Details" tab, where this button may be used. When pressed, the page may redirect the user back to the "Calendar" tab, and a popup box may appear with the following message "<date> removed successfully."

Assignment

This tab may be accessed when a bank holiday has been saved under the "Details" tab. Two information tables and two buttons may be associated with this tab; these are as follows:

Unassigned Countries:

All countries viewable from under the "Calendar" tab which are not associated with the bank holiday in question may be listed in this field.

Assigned Countries:

All countries that are associated with the bank holiday in question may be listed in this field.

Assign:

This button may be used when a country from the "Unassigned Countries" list is selected. Once pressed, the selected country may move from this list and be placed in the "Assigned Countries" list.

Unassign:

This button may be used when a country from the "Assigned Countries" list is selected. Once pressed, the selected country may move from this list and be placed in the "Unassigned Countries" list.

ii. Planned Site-Recursive Activities

The purpose of the planned site-recursive activities interface concept 150 may be to create, modify, and delete activities that should be executed for each site, depending on the current issue of an implementation date. To access this page for the purpose of creating, editing or deleting an activity, the following link may be used:

Root\SED\Scheduling\Site Activities.

In one embodiment, three tabs are associated with this page, the details of which are as follows:

Activity List

In one embodiment, one information area and three buttons are associated with this tab, the details of which are as follows:

Planned Activity List:

This information area may show a list of planned activities created within CLAM tool 20. Each entry may be selectable.

Add:

This button may be used to create a new activity. When pressed, the page may redirect the user to the "Detail" tab.

Edit:

This button may be used when a planned activity already exists. An activity may be selected from the "Planned Activity List" table and this button may be pressed. Once pressed, the page may redirect the user to the "Detail" tab.

Delete:

This button may be used to delete an activity that has already been created. An activity may be selected from the "Planned Activity List" table, and this button may be pressed. If no members are subscribed to the selected activity, a popup box may appear with the following message: "You cannot delete a group that has subscribed members." If a successful deletion has taken place, the following popup message may appear "<activity name>, has been successfully deleted."

Detail

This tab may be accessible when the "Add" or "Edit" button has been pressed from the "Activity List" tab. Five text fields, three check boxes, and two buttons may be associated with this tab; these are as follows:

Schedule ID:

This field may be populated with a randomly generated ID. This field may not be editable.

Activity Name:

The new activity's name may be input here.

Implementation Offset:

The number of days before or after the implementation date when this activity is scheduled to take place may be input into this field.

Number of Man Days:

The number of days that it may take to complete the activity may be input into this field.

Time Code:

The time code for which this activity should be booked may be input into this field.

Work Schedule:

The check boxes, "Saturdays", "Sundays" and "Bank Holidays" may be checked if the planned activity will include work on these days.

Spell Check:

This button may be used to check the spelling of what has been included in the "Activity Name" field.

Save:

This button may be used successfully when certain fields have been completed. If pressed while creating a new activity, the page may redirect the user to the "Team Ownership" tab, and a popup box may appear with the message "<Activity Name>, has been successfully added." If however it is pressed after a previously created activity has been edited, the page may redirect the user to the "Activity List" tab with the following popup message showing "The requested change was successful."

Team Ownership

In one embodiment, this tab may be accessed when the save button under the "Details" tab is pressed for the creation of a new activity or when an activity is selected under the "Activity List" tab and the "Edit" button is pressed. In the latter case, the page may not automatically redirect to this page; however, the tab may be selectable from the "Detail" tab screen. Two information tables and two buttons may be associated with this tab; the details of which are as follows:

Resource Team Selection:

This area may display a list of all resource teams that can be assigned to the selected activity.

Assigned Resource Team:

This area may display a list of resource teams already assigned to the selected activity Assign:

This button may be used when a resource team from the "Resource Team Selection" list is selected. Once pressed, the selected team may move from this list and may be placed in the "Assigned Resource Team" list.

Unassign:

This button may be used when a resource team from the "Assigned Resource Team" list is selected. Once pressed, the selected team may move from this list and may be placed in the "Resource Team Selection" list.

D. Systems Administration i. Utilities a. User Details

The purpose of the user details interface concept 150 may be to create, edit, and delete system administration users. To access this page for the purpose of creating a new systems administrative user, the following path may be used:

Root\SED\Systems Admin\Utilities\Create User.

To access this page for the purpose of editing or deleting a systems administrative user, the following path may be used:

Root\SED\Systems Admin\Utilities\User Browser.

In one embodiment, three tabs are associated with this page, the details of which are as follows:

Account Details

The users personal information may be captured in this field. Ten fields and two buttons may be associated with this tab; these are as follows:

Login:

A unique alphanumeric entry may be used (e.g., A7FDZ3). A login ID may be unique so that the system security features can be enforced. If the login ID already exists, the following message will be displayed when a user has pressed the "Save" button: "This Login ID already exists and cannot be duplicated. YOUR DATA HAS NOT BEEN SAVED"

Full Name:

The users full name may be entered in this field. The preferred format may be forename(s) and surname, (e.g., John Joe Smith). The "-" symbol may be used for double barreled names. The ability to input pseudo names (e.g., Administrator 123) may also be included.

Password:

An alphanumeric entry may be used. A "*" may be displayed on the screen for security reasons. The password may be used in conjunction with the login ID by the user to gain access to the CLAM tool 20.

Telephone Number:

A new user's contact telephone number may be entered in this field.

Extension:

The user's telephone extension number may be entered in this field.

Mobile Number:

The user's mobile phone contact number may be entered in this field.

Email:

The user's Email address may be entered in this field.

Area Code:

The user's area code may be entered in this field.

Town:

A list of towns may appear that are associated with the entered post code. One of these towns may be selected. If nothing is listed here then go back to area code and try again.

Public Contact:

This may be displayed as a check box. This box may be checked if the new user is to be registered as a contact for the given project under which they are being set up.

Save:

This button may be used when all mandatory fields have been completed. If a save is successful, the user may be redirected to the "Group Membership" tab.

Delete:

This button may be visible when editing or viewing a user. The user may be deleted by pressing this button. Once the "Save" button is pressed, a message may pop up if successful which reads "<name>, has been added to the system users," at the same time the user is redirected to the next tab associated with this page. If neither of these actions occurs, then the user's details may not be saved and may need to be input again.

Regardless of whether or not the save was successful, the entire page may be refreshed, removing all input data. If there was an error (e.g., Login Duplication), the data may need to be input again. It may be advisable to recheck to make sure the input data is correct before saving.

Group Membership

In one embodiment, this tab may be accessed when the save button is pressed on the previous tab and the save is successful when a new user is being created, or when an existing user is being edited or viewed.

Two information areas and two buttons may be associated with this tab, the details of this are below:

Group Restrictions:

This information area may include a list of groups to which the system administrator user currently has no access. Each entry in this information area may be selected.

Account Membership:

The information in this area may include the groups to which the system administrator user has been given access. Each entry in this information area may be selected.

Grant:

After selecting a system group from the "Group Restrictions" information area, the system group selected may move across to the "Account Membership" Information area giving the system administrator user access to that group.

Revoke:

This may provide the option of removing a system administrator user's system group access. This may be done by selecting a system group under the information area "Account Membership" and pressing the "Revoke" button, which may move the system group to the other information area.

These groups may determine what the user may view and access when logging into CLAM tool 20 setting up the user's rights to the CLAM tool 20. In one embodiment, the new user may only be associated with groups to which the person inputting their data has access themselves (i.e., a user may not be able to grant someone else greater accessibility to CLAM tool 20 than they themselves currently have).

Resource Role

A user may be assigned a "Resource Role" using this tab, which may determine the interaction rights of the user with the information they can view through the groups with which they have been associated. Unlike the "Group Membership" information in certain embodiments only one role may be assigned to a user. This may be done by selecting the appropriate role and clicking on the "Assign" button.

Editing a Systems Administration User:

A "User Locator" page may be displayed by clicking on the "User Browser" link.

Deleting a Systems Administration User:

The following link may be selected to arrive at this page for the purpose of deleting a systems administrator user:

Root\SED\Systems Admin\Utilities\User Browser.

The "User Locator" page may be displayed by clicking on the "User Browser" link "Details" page, the user's details may be deleted. In one embodiment, certain steps must first be taken.

1. The groups that have been associated with the user under the "Groups Membership" tab may be removed from them by selecting all groups and clicking on the "Revoke" button.

2. The role that has been assigned to the user under the "Resource Role" tab may be removed by selecting the role in question and pressing the "Unassign" button.

In this embodiment, once these two steps are taken, it is possible to delete the user by clicking on the "Delete" button under the "Account Details" tab.

b. Day Book Report

The purpose of the day book report interface concept 150 may be to create a report based on the report criteria that has been chosen. Depending on what report is required, at least one of the following links may be used to access this page:

Root\SED\Procurement\Ordering Report;
Root\SED\System Admin\Utilities\Daybook Report;
Root\SED\Work Flow\Change Requests;
Root\SED\Work Flow\High Level Summary;
Root\Estates\Assets\Asset Report;
Root\Estates\Buildings\Address Report; and
Root\Estates\Buildings\Logistics Report.

The details of the form associated with the day book report interface concept 150 are as follows:

Report Generator

In one embodiment, two fields and one button are associated with this report form. As this page may be accessible from a number of links, the report criteria required in the fields on this page may vary. The following links apply to the report criteria detailed below:

Root\SED\Procurement\Ordering Report; and
Root\SED\System Admin\Utilities\Daybook Report.

Date Start:

The date when the report should start may be entered in this field.

Date End:

The date when the report should end may be entered in this field.

Generate:

This button may be used when valid data has been entered into both fields. Once pressed, a period of time may elapse, which may be based on the amount of data that is being transferred into the report document. After this time period, a download box may appear with four options: Open, Save, Cancel, and More Info. If the report is still required, the "open" or "save" button may be activated. The "cancel" button may cancel the operation. If the "save" button is pressed, the "save as" box may appear, providing the option of where to save the zip file and what to call it. After this information is decided, the "save" button on this pop-up box may be pressed. Once pressed, the file may be downloaded and the "save as" box may disappear leaving the "download" box viewable.

The "open" button may do one of two things: If pressed after the "save" button, this button may open the file on the computer that to which it was saved. If the "save" button has not been pressed, the file may still be opened from the local computer, but the file is only there temporarily and may disappear after use unless the file is saved after being opened. Either way an application that can read "Zip" files will be required to access this file. The report is then accessible from within this zip file, and is saved as a PDF file. The information and format of this PDF file may depend on the report criteria.

The following links apply to the report criteria detailed below:

Root\SED\Work Flow\Change Requests;
Root\SED\Work Flow\High Level Summary;
Root\Estates\Assets\Asset Report;
Root\Estates\Buildings\Address Report; and
Root\Estates\Buildings\Logistics Report.

Building Name Start:
The building name from which the report should start may be entered in this field. For example, "Apley Plaza."

Building Name End:
The building name at which the report should stop may be entered in this field. For example, "Zenko Complex."

Generate:
This button may be used when valid data has been entered into both fields. Once pressed, a period of time may elapse, which may be based on the amount of data that is being transferred into the report document. After this time period, a download box may appear with four options: Open, Save, Cancel, and More Info. If the report is still required, the "open" or "save" button may be activated. The "more info" button links to a browser help file. The "cancel" button may cancel the operation. If the "save" button is pressed, the "save as" box may appear, providing the option of where to save the zip file and what to call it. After this information is decided the "save" button on this pop-up box may be pressed. Once pressed, the file may be downloaded and the "save as" box may disappear leaving the "download" box viewable. The "open" button may do one of two things: If pressed after the "save" button, this button may open the file on the computer to which it was saved. If the "save" button has not been pressed, the file may still be opened from the local computer, but the file may only be there temporarily and may disappear after use unless the file is saved after being opened. Either way an application that can read "Zip" files may be required to access this file. The report is then accessible from within this zip file, and may be saved as a PDF file. The information and format of this PDF file may depend on the report criteria.

c. Geographical Data

The purpose of the geographical data interface concept 150 may be to add or edit a postal town. The path to this page for the purpose of creating or editing a postal towns information may be:

Root\SED\System Admin\Geographic Data.

The user may see the fields defined below except for, in certain embodiments, the "Save" button. If the town to be created is not in a drop-down list, the following fields may be entered with the appropriate details:

Area Code:
This field may be to search for towns associated with whatever area code is entered here. If the town the user wishes to create is not listed, the area code may be used as a reference for future searches and other practices within CLAM tool 20.

"?" Button:
This button may be used when data is input into the "Area Code" field. If no data is input, an alert box may popup, requesting that the user enter a value into the "Area Code" field.

Town:
When the area code is entered and the "?" button pressed, this field may become a drop down list which has information regarding all towns that have been created in CLAM tool 20 with the same area code reference.

New:
This button may appear when other towns are associated with the an area code reference, providing the ability to add a new town.

County:
If the "New" button is pressed, this field may be input with the county associated with the area code reference.

Country:
If the "New" button is pressed, this field may be input with the country associated with the area code reference.

Longitude:
The longitude of the town may be entered in this field.

Latitude:
The latitude of the town may be entered in this field.

Save:
The "Save" button may be pressed when all mandatory fields are complete. Once pressed, the page may refresh with the new town now included in the "Town" drop down list.

d. System Group Maintenance

The purpose of the system group maintenance interface concept 150 may be to add, edit, or delete system groups. The following path may be used to create, edit, or delete a system group:

Root\SED\System Admin\Utilities\System Groups.

In one embodiment, three tabs are associated with this page, the details of which are as follows:

Group List

In one embodiment, an information area and three buttons may be associated with this tab, the details of which are as follows:

System Groups:
This information area may provide a list of system groups already created within CLAM tool 20.

Add:
This button may be used when adding a new system group. When pressed, the user may be redirected to the "Detail" tab.

Edit:
This button may be pressed if a system group already exists. The system group is selected and this button may be pressed. The user may be redirected to the "Detail" tab.

Delete:
This button may be pressed if a system group already exists. The system group may be selected, and this button pressed. The system group may then be deleted from the "System Groups" list. A successful deletion may occur once all system administrator users subscribed to the system group have been unsubscribed.

Detail

This tab may be accessible when either the "Add" button has been pressed or a system group is selected and the "Edit" button has been pressed from under the "Group List" tab. Two fields and one button may be associated with this tab; these are as follows:

Group ID:
This may be a unique identifier generated by CLAM tool 20.

Group Name:
The name of the system group may be entered in this field.

Save:
This button may be used when the "Group Name" fields have been completed. After this button is used, the user may be redirected to the "Group List" tab, and the system group that has been created or edited is now in the "System Groups" list.

Membership

This tab may be accessed when a system group is selected from the "Group List" tab and the edit button is pressed. The edit button may not take the user directly to this tab, but the user may have the ability to navigate to this tab from the "Detail" tab. Two information areas and two buttons may be associated with this tab; the details of which are as follows:

Unsubscribed:

This information field may show the system administrator users that are not associated with the system group. Each entry may be selectable.

Subscribed:

This information field may show the system administrator users that are associated with the system group. Each entry may be selectable.

Subscribe:

This button may be pressed once a system administrator user has been selected from the "Unsubscribed" information area. By pressing this button, the system administrator user may be moved to the "Subscribed" information area.

Unsubscribe:

This button may be pressed once a system administrator user has been selected from the "Subscribed" information area. By pressing this button, the system administrator user may be moved to the "Unsubscribed" information area.

e. User Browser

The purpose of the user browser interface concept 150 may be to search CLAM tool 20 and locate system administrator users. The following path may be used:

Root\SED\System Admin\Utilities\User Browser.

In one embodiment, the following two areas are associated with this page:

System User Details

In one embodiment, three fields and one button are associated with this area, the details of which are as follows:

Login ID:

Part or all of the system users CLAM login ID may be entered in this field.

Full Name:

The system users full name, as captured within CLAM tool 20, may be entered in this field.

Telephone Number:

Part or all of the system user's telephone number, recorded within CLAM tool 20, may be entered in this field.

Search:

This button may be pressed once searchable criteria has been entered into one or more of the above fields. When pressed, the user may be redirected to the results page.

Search Criteria Results:

This area may be viewable once the "Search" button has been pressed from the "System User Details" search criteria area. One information area and one buttons may be associated with this area; these are as follows:

User Locator

In one embodiment, this information area includes a table of results depending on what search criteria was specified. Three columns may be associated with this table, including login ID, full name, and telephone number. Each row in this table may be selectable.

New Criteria:

This button may be pressed when the results of the previous search have not been successful. The user may then be redirected back to the "System User Details" search criteria area.

When the system user required has been found and selected, the user may be redirected to the "User Details" page.

E. Workflow i. Change Requests

The purpose of the change requests interface concept 150 may be to create a report based on selected report criteria. Depending on which report is required, one or more of the following links may be used:

Root\SED\Procurement\Ordering Report;
Root\SED\System Admin\Utilities\Daybook Report;
Root\SED\Work Flow\Change Requests;
Root\SED\Work Flow\High Level Summary;
Root\Estates\Assets\Asset Report;
Root\Estates\Buildings\Address Report; and
Root\Estates\Buildings\Logistics Report.

In one embodiment, the report page is only one form, with no tabs. The details of this form are as follows:

Report Generator

In one embodiment, two fields and one button are associated with this report form. As this page may be accessible from a number of links, the report criteria required in the fields on this page may vary. The details of the report criteria and what links are associated with them are as follows:

Root\SED\Procurement\Ordering Report; and
Root\SED\System Admin\Utilities\Daybook Report.

The details of these are as follows:

Date Start:

The date when the report should start may be entered in this field.

Date End:

The date when the report should end may be entered in this field.

Generate:

This button may be used when valid data has been entered into both fields.

Once pressed, a period of time may elapse, which may be based on the amount of data that is being transferred into the report document. After this time period, a download box may appear with four options: Open, Save, Cancel, and More Info. If the report is still required, the "open" or "save" button may be activated. The "more info" button links to a browser help file. The "cancel" button may cancel the operation. If the "save" button is pressed, the "save as" box may appear, providing the option of where to save the zip file and what to call it. After this information is decided, the "save" button on this pop-up box may be pressed. Once pressed, the file may be downloaded and the "save as" box may disappear leaving the "download" box viewable. The "open" button may do one of two things: If pressed after the "save" button, this button may open the file on the computer to which that it was saved. If the "save" button has not been pressed, the file may still be opened from the local computer, but the file may only be there temporarily and may disappear after use unless the file is saved after being opened. Either way an application that can read "Zip" files may be required to access this file. The report is then accessible from within this zip file, and may be is saved as a PDF file. The information and format of this PDF file may depend on the report criteria.

The following links apply to the report criteria detailed below:

Root\SED\Work Flow\Change Requests;
Root\SED\Work Flow\High Level Summary;
Root\Estates\Assets\Asset Report;
Root\Estates\Buildings\Address Report; and
Root\Estates\Buildings\Logistics Report.

Building Name Start:

The building name from which the report should start may be entered in this field. For example, "Apley Plaza."

Building Name End:

The building name at which the report should stop may be entered in this field. For example, "Zenko Complex."

Generate:

This button may be used when valid data has been entered into both fields. Once pressed, a period of time may elapse, which may be based on the amount of data that is being transferred into the report document. After this time period, a download box may appear with four options: Open, Save, Cancel, and More Info. If the report is still required, the "open" or "save" button may be activated. The "more info" button links to a browser help file. The "cancel" button may cancel the operation. If the "save" button is pressed, the "save as" box may appear, providing the option of where to save the zip file and what to call it. After this information is decided, the "save" button on this pop-up box may be pressed. Once pressed, the file may be downloaded and the "save as" box may disappear leaving the "download" box viewable. The "open" button may do one of two things: If pressed after the "save" button, this button may open the file on the computer to which that it was saved. If the "save" button has not been pressed, the file may still be opened from the local computer, but the file may only be there temporarily and may disappear after use unless the file is saved after being opened. Either way an application that can read "Zip" files may be required to access this file. The report is then accessible from within this zip file, and may be is saved as a PDF file. The information and format of this PDF file may depend on the report criteria.

ii. High Level Summary

The purpose of the high level summary interface concept 150 may be to create a report based on selected report criteria. Depending on what report is required, one or more of the following links may be used:

Root\SED\Procurement\Ordering Report;
Root\SED\System Admin\Utilities\Daybook Report;
Root\SED\Work Flow\Change Requests;
Root\SED\Work Flow\High Level Summary;
Root\Estates\Assets\Asset Report;
Root\Estates\Buildings\Address Report; and
Root\Estates\Buildings\Logistics Report.

In one embodiment, the report page is only one form, with no tabs. The details of this form are as follows:

Report Generator

In one embodiment, two fields and one button are associated with this report form. As this page may be accessible from a number of links, the report criteria required in the fields on this page may vary. The details of the report criteria and what links are associated with them are as follows:

Root\SED\Procurement\Ordering Report; and
Root\SED\System Admin\Utilities\Daybook Report.

The details of these are as follows:

Date Start:

The date when the report should start may be entered in this field.

Date End:

The date when the report should end may be entered in this field.

Generate:

This button may be used when valid data has been entered into both fields. Once pressed, a period of time may elapse, which may be based on the amount of data that is being transferred into the report document. After this time period, a download box may appear with four options: Open, Save, Cancel, and More Info. If the report is still required, the "open" or "save" button may be activated. The "more info" button links to a browser help file. The "cancel" button may cancel the operation. If the "save" button is pressed, the "save as" box may appear, providing the option of where to save the zip file and what to call it. After this information is decided, the "save" button on this pop-up box may be pressed. Once pressed, the file may be downloaded and the "save as" box may disappear leaving the "download" box viewable. The "open" button may do one of two things: If pressed after the "save" button, this button may open the file on the computer to which that it was saved. If the "save" button has not been pressed, the file may still be opened from the local computer, but the file may only be there temporarily and may disappear after use unless the file is saved after being opened. Either way an application that can read "Zip" files may be required to access this file. The report is then accessible from within this zip file, and may be is saved as a PDF file. The information and format of this PDF file may depend on the report criteria.

The following links may apply to the report criteria detailed below:

Root\SED\Work Flow\Change Requests;
Root\SED\Work Flow\High Level Summary;
Root\Estates\Assets\Asset Report;
Root\Estates\Buildings\Address Report; and
Root\Estates\Buildings\Logistics Report.

Building Name Start:

The building name from which the report should start may be entered in this field. For example, "Apley Plaza."

Building Name End:

The building name at which the report should stop may be entered in this field. For example, "Zenko Complex."

Generate:

This button may be used when valid data has been entered into both fields. Once pressed, a period of time may elapse, which may be based on the amount of data that is being transferred into the report document. After this time period, a download box may appear with four options: Open, Save, Cancel, and More Info. If the report is still required, the "open" or "save" button may be activated. The "more info" button links to a browser help file. The "cancel" button may cancel the operation. If the "save" button is pressed, the "save as" box may appear, providing the option of where to save the zip file and what to call it. After this information is decided, the "save" button on this pop-up box may be pressed. Once pressed, the file may be downloaded and the "save as" box may disappear leaving the "download" box viewable. The "open" button may do one of two things: If pressed after the "save" button, this button may open the file on the computer to which that it was saved. If the "save" button has not been pressed, the file may still be opened from the local computer, but the file may only be there temporarily and may disappear after use unless the file is saved after being opened. Either way an application that can read "Zip" files may be required to access this file. The report is then accessible from within this zip file, and may be is saved as a PDF file. The information and format of this PDF file may depend on the report criteria.

II. Administration

A. Maintaining Members of Staff

The purpose of the maintaining members of staff interface concept 150 may be to create, edit, and delete client members of staff. The following link may be used to access this page for the purpose of creating a member of staff:

Root\Organisation\Add Staff.

To access this page for the purpose of editing or deleting a member of staff, the following link may be used:

Root\Organisation\Staff Locator.

In one embodiment, four tabs are associated with this page, the details of which are as follows:

Member of Staff Details

In one embodiment, twenty-one fields and two buttons are associated with this tab, the details of which are as follows:

Staff ID:

This field may be used for entering a unique identifier for a member of staff. For example, this could be the staff member's payroll number or computer login name. If the entered staff ID already exists, when the user is finally ready to save the information on this page, an alert box may pop up indicating that the Staff ID as already existing.

Title:

This drop down list may provide the user the ability to pick from a pre defined list of titles.

First Name:

The member of staffs first name may be entered in this field.

Middle Name:

The member of staffs middle name may be entered in this field, if applicable.

Surname:

The member of staffs surname may be entered in this field.

Alias:

The name that the member of staff prefers may be entered in this field. This field may also be useful when dealing with secure environments such as when the staff members real name needs to be kept anonymous.

Employment Type:

The employment status of the staff member may be selected from a predefined drop down list, (e.g., Full time, Part time, etc).

User Type:

The member of staffs working status may be selected from a drop down list (e.g., Office User, Home User, etc.).

Organizational Unit:

This may include a fixed field and may be based on what the user selects from the Organization Locator. This Organization Locator may be accessed by pressing the small "?" button at the right hand side of this field.

Email:

An email address for the member of staff may be entered in this field.

Default Telephone:

A telephone number for the member of staff may be entered in this field.

Default Extension:

The internal extension number of the member of staff may be entered in this field, if applicable.

Mobile:

The member of staffs mobile phone number may be entered in this field.

Fax:

The member of staffs fax number may be entered in this field, if applicable.

Pager:

The member of staffs pager number may be entered in this field, if appropriate.

Home Telephone:

The member of staffs home telephone number may be entered in this field.

Password:

A password may be entered in this field.

Cost Center:

A cost center associated with the member of staff may be entered in this field.

Public Contact:

This may include a check box that can be checked if the member of staff is to be a contact for a project to which they are being added.

Deployable Resource:

This check box may be enabled when the user has reached this field through the "Staff Locator" menu link. This check box may be used when the member of staff in question can be used elsewhere as a resource for the client, (e.g., an Engineer who can be deployed to any site).

Project Specific:

This check box may be enabled when the user has reached this field through the "Staff Locator" menu link. This field may be checked if the member of staff is attached to a specific project and cannot be used by another project.

Save:

This button may be used when all mandatory fields have been filled. When this has occurred and the "Save" button is pressed the information may be saved and the user may be redirected to the "Location Details" tab. If the save is not successful, an alert box may pop up identifying encountered problems.

Delete:

This button may be enabled when the user has reached this field through the "Staff Locator" menu link. The user may press this button to delete the selected staff member whose details are on the page.

Location Details

This tab may be displayed when a successful save of a new member of staff occurs. In one embodiment, seven fields and eight buttons are associated with this tab, the details of which are as follows:

Building ID:

The information in this field is populated depending on what Building is selected through the "?" button at the right of this field. "?" Button next to Building ID field:

By pressing on this button the "Building Locator" pop up will appear.

Work Area ID:

The information in this field is populated depending on what Work Area is selected through the "?" button at the right of this field. This data is not editable directly in this field.

"?" Button Next to Work Area ID Field:

This button can only be pressed once a Building is selected. When pressed the "Work Area Locator" pop up appears.

Location:

The location within the work area where the staff member works may be entered in this field. An example of a location is a desk number.

"Add>>" Button Next to Location Field:

This button may be used when a building and work area have been selected and the location field includes data.

Telephone:

The telephone number of the location may be entered in this field.

Extension:

The extension number of the location may be entered in this field.

Location Point:

This information area may include a list of locations that are already associated with the member of staff. A member of staff may be associated with a number of locations and each of these locations may be added under this tab.

Update:

This button may be active when a location is selected under the "Location Point" information area and the "Edit" button pressed. This button may be pressed when details of an existing location are altered.

Add New:

This button may be enabled when a new location is added or a previous location is edited and updated. By pressing this button, the page refreshes itself and the details in the left-hand fields are removed.

Edit:

This button may be used if a location already exists in the information area name "Location Points." A location may be selected, and this button may become active. Details pertaining to a selected location may appear in the fields on the left hand side. These details can then be updated.

Delete:

This button may be used if a location already exists in the information area name "Location Points." Once a location is selected, this button may be pressed to remove the selected location from the "Location Points" information area.

Edit Profile:

This button allows the user to access the tabs named "Groups" and "Roles." A location may be selected when this button is pressed, the user may be redirected to the "Groups" tab.

Groups

This tab may be accessed by editing a Location Point under the tab "Location Details." In one embodiment, two fields and two buttons are associated with this tab, the details of which are as follows:

Category:

This drop down list may switch the tab view between "Local" groups and "Global" groups.

Groups Information Area:

This information area may display a list of groups associated with the member of staff.

Add:

After a "Category" is selected, this button may open the "Group Selector" popup.

Delete:

This button may be used when the following conditions apply. First, a group may be selected from the information area under this tab. Second, the group may be an approved group for that location point.

Roles:

This tab may be accessed by editing a Location Point under the tab "Location Details." Two fields and two buttons may be associated with this tab, which are detailed below:

Category:

This drop down list may switch the tab view between "Local" roles and "Global" roles.

Roles Information Area:

This information area may display a list of roles associated with the member of staff.

Add:

After a "Category" is selected, this button may open the "Role Selector" popup.

Delete:

This button may be used when the following conditions apply. First, a role may be selected from the information area under this tab. Second, the role may be an approved role for that location point.

FIG. 5 illustrates an example method for processing a workflow using CLAM tool 20. At step 200, CLAM tool 20 receives a change impact request. For example, a change impact request may be generated when an individual subscribes to a group or role. The individual may be a new employee of the enterprise who is subscribing to groups or roles for the first time, a current employee who is changing subscriptions to groups and roles, a current employee who is adding subscriptions to additional groups and roles, or any other suitable individual or group of individuals according to particular needs. The group or role to which the individual subscribes may determine what products and services are needed for an individual at a particular location point associated with the individual and for the individual's business stream (i.e. so the individual can perform his or her duties according to the group or role). A change impact request may be generated in any other suitable manner, according to particular needs. Furthermore, the change impact request may be communicated to CLAM tool 20 in any suitable manner, according to particular needs.

At step 202, a workflow is created for the change impact request. The workflow may include an incident reference number or other identifier allocated to the change impact request. The change impact request may be displayed as a piece of text on an incidents screen; however, the present invention contemplates displaying the change request in any suitable manner and to any suitable audience according to particular needs. At step 204, the incident may be escalated to a service management team. Although the service management team is primarily described, the present invention contemplates the incident being forwarded to any suitable individual or team. The service management team may be responsible for determining whether the change impact request associated with the incident should be approved. The service management team may examine the requirements that would be necessary if the change impact request were granted. This decision process may be referred to as a change request review phase.

As an example, a change in the infrastructure or other environment of the enterprise may result in one or more costs, such as costs associated with deploying resources or any other suitable costs. It may be desirable to track these costs. As an example, a user may currently be assigned a desktop computer. A change impact request may be generated for the user, requesting a change from the desktop computer to a laptop computer. For example, the user may subscribe to a group or role that requires laptop computers. As another example, the user may simply request a change from a desktop computer to a laptop computer. The change request review process may help determine whether the change impact request is a special need or if it is something that the user should not have in the first place.

At step 206, the service management team may assign the incident to a schedule. At step 208, the service management team may assign the change impact request to a team that will be responsible for the request. In one embodiment, the service managers may assign the incident to an SLA, which may track who is responsible for the activity and the timeframe granted to resolve the incident. Knowing the time frame may allow CLAM tool 20 to determine a due date for delivery of the goods or services required to fulfill the incident. The SLA may also inform the service management of the appropriate team and/or resource to which the incident should be assigned. If the service management team assigns the incident to a team, CLAM tool 20 may notify the members of the team that the incident has been assigned to them. In one embodiment, if the service management team assigns the incident to a specific resource, then CLAM tool 20 only notifies the person (i.e. the specific resource) that there is a specific call to do something. In one embodiment, the incident is sent to the team to which it is assigned, and that team is responsible for determining whether the change impact request associated with the incident should be approved rather than the service management team making this determination.

At step 210, a determination is made regarding whether the change impact request associated with the incident should be validated. If it is determined that the change impact request should not be validated, CLAM tool 20 may notify the individual who submitted the change impact request, along with any other suitable individuals or teams, that the request has been denied at step 212. If it is determined at step 210 that the change impact request associated with the incident should be approved, then one or more business rules may be applied at step 214. Application of the business rules may include notifying the individual who submitted the change impact request that the request has been approved. Application of the business rules may also include examining the individual's profile, and based on that user profile information, determining the best strategy for deploying those information, products, or services associated with the change impact request to the individual.

At step 216, CLAM tool 20 may determine whether the one or more products or one or more services are in stock or whether they need to be ordered. In one embodiment, CLAM tool 20 may search stock automatically. In another embodiment, a user may search stock manually, using the information stored by CLAM tool 20. If the products or services need ordering, then CLAM tool 20 may facilitate ordering of the products or services at step 218. In one embodiment, CLAM tool 20 may order the products or services automatically, substantially without user input. In another embodiment, user interaction may be required. It may be desirable to require at least some user interaction such as user approval for the order, for example. If the products or services do not need to be ordered or after the products have been ordered, CLAM tool 20 may initiate a batching process at step 220. For example, CLAM tool 20 may group items to be delivered to a particular site, building, work area, location point, or other suitable location within a particular time period to avoid making multiple trips to the location. The batching process may allow the products and services for the particular location to be collated. This may help reduce certain duplicative costs associated with making multiple trips to the same location.

At step 222, a bill of materials may be enumerated. In one embodiment, the bill of materials specifies all of the requirements for a particular location as determined by the batching process, for example. At step 224, an outstanding requirements review process may be initiated, which may include checking outstanding change impact requests so that they may be closed (e.g., denied and closed, approved and handled, or otherwise disposed of).

At step 226, a schedule may be created. The schedule may include which deliverable are being grouped together and how the deliverable will be handled. The schedule may assist in managing and maintaining the milestones associated with the schedules. For example, these milestones may include by when the deliverable needs to be delivered something, and the resources needed to deploy the deliverable. At step 228, a good-in process may be initiated. The goods-in process, as described above, may include tracking the goods in with the processes. This may include determining when the stock begins to arrive on site. For example, the goods-in process may notify a user when ten PCs are delivered at the location, so that these ten PCs may be installed or otherwise handled. At step 230, an automatic stock allocation process may be initiated. The automatic stock allocation process may analyze the infrastructure of the enterprise to determine who has asked for what and attempt to package the stock into small work groups. For example, rather than installing one of the ten received machines on each of ten floors of a building, all ten may be installed on one floor, which may improve efficiency. Thus, the automatic stock allocation process may provide instructions regarding how to deploy the received products or services.

At step 232, one or more drop sheets may be generated, which may include a list of where products need to be deployed. In one embodiment, a drop sheet includes a bill key or other suitable reference, which may be a unique value that associates products and services to a specific desk and/or user. A drop sheet may be a physical sheet of paper that may be placed on a person's desk who is waiting for products and services. At step 234, it may be determined whether the products and services that are being deployed are correct for the particular person to whom the products or services were deployed. Initiating a user acceptance and asset capture process may facilitate this determination. As an example, a person deploying products and or services may enter the bill key from a drop sheet into CLAM tool 20, and CLAM tool 20 may notify the person what he should be installing at that desk, for whom, and at what location. CLAM tool 20 may then ask the user if this is correct. If the person answers yes, CLAM tool 20 may automatically electronically audit the machine or other product or service to help ensure that the topology details that were assigned for that deployment have transpired and escalate that information back to the workflow.

At step 236, if the information is accepted, the workflow may be closed. If the information is not accepted, additional elements relating to the workflow may be generated at step 238. This may be similar to a call stack, which indicates that more work needs to be done in certain areas. In one embodiment, if one or more issues or problems occur during deployment for a particular location, a team follow-up or personal follow-up may be used to add commentary or add activities to transpire the next time the site is visited. This may create a new incident for this additional work. In one embodiment, the team follow-up, personal follow-up, or both occur regardless of whether the information is accepted.

Although a particular method for processing a workflow using CLAM tool 20 has been described with reference to FIG. 5, the present invention contemplates any suitable method for processing a workflow using CLAM tool 20 in accordance with the present invention. Thus, certain of the steps described with reference to FIG. 5 may take place simultaneously and/or in different orders than as shown. Moreover, CLAM tool 20 may use methods with additional steps, fewer steps, and/or different steps, so long as the methods remain appropriate.

Figure 6:
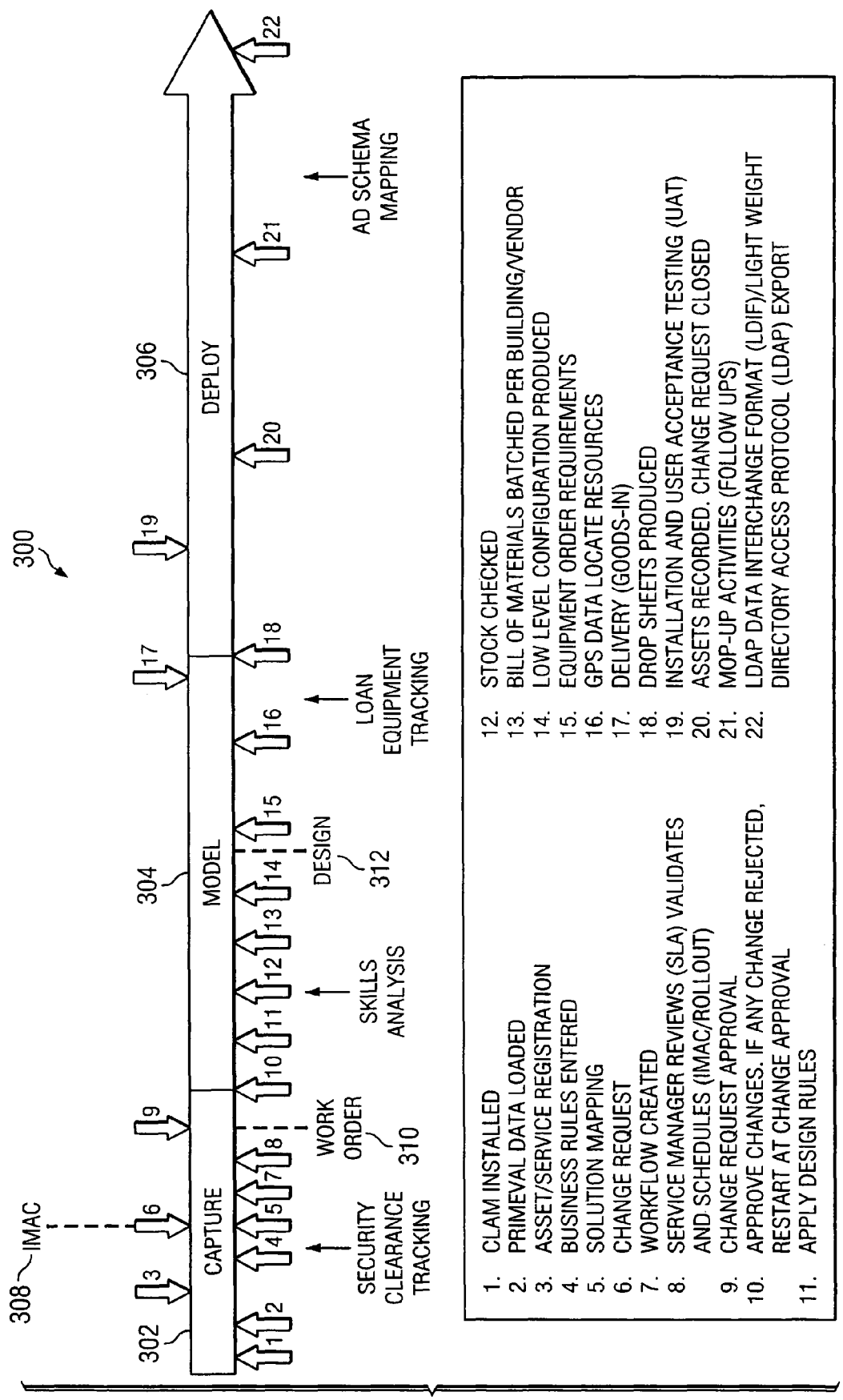
FIG. 6 illustrates an example lifecycle for delivering a workflow using a CLAM tool.

FIG. 6 illustrates an example lifecycle 300 for delivering a workflow using CLAM tool 20. In one embodiment, lifecycle 300 includes a capture phase 302, a model phase 304, and a deploy phase 306, which may correspond to the capture, model, and deploy phases, respectively, described above with reference to FIG. 1. Although these three phases are described, the present invention contemplates lifecycle including any suitable phases according to particular needs.

Capture phase 302 may include capturing certain infrastructure information about the enterprise, such as by determining and storing information about existing assets and or requirements. As described above with reference to FIG. 1, this captured information may be divided into two areas: an existing area and a requirements area. The existing area may include location profiles, asset profiles, service profiles, staff profiles, business profiles, and any other suitable information according to particular needs. The existing area may be used to capture the existing picture of an enterprise's assets, including the enterprise's infrastructure. An enterprise's infrastructure may include hardware, software, services, members of staff, workplaces, premises, organizational units structure, topology, logistics, facilities, and any other suitable assets according to particular needs. The requirements area may include the IMAC process. For example, the requirements area may include an impact analysis involving users, products, services, locations, work areas, buildings, topologies, stock, licenses, migration strategy, schedule, resources, and any other suitable considerations according to particular needs.

Modeling phase 304 may include creating a proposed environment for the enterprise. For example, as described above with reference to FIG. 1, in order to implement change in an enterprise's infrastructure it may be necessary to model the proposed change. Topology considerations such as network addressing, connectivity, and server mapping, for example, may be important. As another example, validation considerations such as business rules, automatic evaluation, shared profiles, and environmental issues may be important.

Modeling phase 304 may be important to help "capacity manage" for the enterprise. For example, assume an office has a network printer that experiences heavy use throughout a workday. It might be undesirable to assign too many users to that printer because this might result in a bottleneck. Thus, it might be desirable to limit the number of users assigned to the printer to eight. Once eight people are assigned to the printer, it may be necessary to deploy a second printer to share the workload. Modeling phase 304 may help understand this capacity management. As another example, a particular role may involve heavier use of some asset, such as a server or a printer, relative to other roles, and modeling phase 304 may consider that requirement. The use of the asset may be included as a service for the individual. The service may include an assessment of the requirements in an individual's profile, specifying that the user has excessive printing requirement. This may be addressed in modeling phase 304 so that, in the example of the printer, the user is assigned to a relatively fast printer or to assign a fewer number of users to the printer that is assigned to this user's printer. As another example, a workstation may be shared among a number of members of staff (e.g., an approach-and-use machine or a hot desk). Modeling phase 304 may capture and consider the possibility that several people a day may use the workstation.

Deploy phase 306 may include implementing one or more proposed changes to the IT infrastructure of an enterprise, for example by deploying one or more assets, services, or other suitable items to a particular location. To deploy assets in the deploy phase of CLAM, important considerations may include stock availability, license availability, ordering, delivery tracking, geography, resources, schedule, the IMAC process, UAT, and any other suitable considerations according to particular needs.

Lifecycle 300 may include an IMAC process 308, a work order generation 310, and a design process 312. In one embodiment, IMAC process 308 includes the install, move, add, and change process for capturing existing assets and/or requirements of an enterprise. In one embodiment, work order generation 310 may be use to obtain confirmation that the work to be performed is what is desired (i.e. that it meets the requirements determined in IMAC process 308). The work order may include a printed statement of work that should be signed or otherwise approved by someone associated with the enterprise having the appropriate authority to authorize the work order. Design process 312 may include the resolution of one or more technicalities so that the requirements can be met according to the work order. Design process 312 may result in the generation of one or more documents, which may be performed substantially automatically using CLAM tool 20.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A server system configured to manage information technology (IT) infrastructure of an enterprise, the server system comprising:
at least one electronic computing device configured to execute a centralized logistics and management (CLAM) tool operable to:
in a capture phase:
capture and store IT infrastructure information regarding the IT infrastructure of the enterprise;
define a plurality of roles within the enterprise, each role specifying a particular job function within the enterprise;
assign first items of IT infrastructure to a first role within the enterprise and assign second items of IT infrastructure to a second role within the enterprise, wherein the second items include one or more items of IT infrastructure not included in the first items; and
assign the first role to first employees of the enterprise, which assigns the first items of IT infrastructure to the first employees of the enterprise, and assign the second role to second employees of the enterprise, which assigns the second items of IT infrastructure to the second employees of the enterprise, wherein the second employees include one or more employees of the enterprise not included in the first employees;
in a modeling phase:
model the acceptability of topology considerations of the enterprise in a first proposed environment of each of the first employees assigned the first role, the first proposed environment including the first items of IT infrastructure assigned to the first role; and
model the acceptability of topology considerations of the enterprise in a second proposed environment of each of the second employees assigned the second role, the second proposed environment including the second items of IT infrastructure assigned to the second role; and
in a deployment phase, automatically initiate deployment of the modeled change in the first items of IT infrastructure assigned to the first employees of the enterprise, which includes organizing delivery of the modeled change in the first items of IT infrastructure to implement the modeled change in the first items of IT infrastructure, and automatically initiate deployment of the modeled change in the second items of IT infrastructure assigned to the second employees of the enterprise, which includes organizing delivery of the modeled change in the second items of IT infrastructure to implement the modeled change in the second items of IT infrastructure,
wherein the capture, modeling, and deployment phases are included in a process comprising:
receiving a change request;
creating an incident for the change request;
determining whether to approve the change request and if the change request is approved applying one or more business rules to the change request and initiating deployment of IT infrastructure assets for fulfilling the change request; and performing one or more follow-up procedures for determining whether the IT infrastructure assets for fulfilling the change request were properly deployed and, if the IT infrastructure assets were not properly deployed, creating a new incident for resolving problems associated with the deployment of the IT infrastructure assets.

2. The system of claim 1, wherein the IT infrastructure of the enterprise comprises one or more computer-related facilities, services, and installations used for operations of the enterprise, comprising one or more of:
computer hardware; and
computer software.

3. The system of claim 1, wherein the capture phase comprises an existing IT assets area for capturing an existing view of IT infrastructure assets of the enterprise, the existing IT assets area comprising one or more of:
asset profiles for IT infrastructure assets of the enterprise;
employee profiles for employees of the enterprise;
location profiles for locations associated with the enterprise; and
division profiles for divisions of the enterprise.

4. The system of claim 1, wherein the CLAM tool is further operable to, if a role assigned to a particular employee is changed to a different role, change the items of IT infrastructure associated with the particular employee to reflect the different role.

5. The system of claim 1, wherein for a particular employee who is assigned one or more roles, the CLAM tool is further operable to assign one or more additional items of IT infrastructure to the particular employee such that the particular employee receives the one or more additional items of IT infrastructure.

6. The system of claim 1, wherein the CLAM tool is further operable to model a change in the IT infrastructure and automatically initiate deployment of the change in the IT infrastructure, wherein the change in the IT infrastructure comprises a technology refresh for one of:
a particular employee of the enterprise;
a particular group of employees of the enterprise;
all employees of a division of the enterprise; and
all employees of the enterprise.

7. The system of claim 1, wherein the CLAM tool is further operable to model a change in the IT infrastructure and automatically initiate deployment of the change in the IT infrastructure, wherein the change in the IT infrastructure comprises a technology refresh for one or more of:
a particular workspace of the enterprise;
a work area comprising a plurality of workspaces;
a building of the enterprise; and
all sites associated of the enterprise.

8. The system of claim 1, wherein the CLAM tool is further operable to model a change in the IT infrastructure and automatically initiate deployment of the change in the IT infrastructure, wherein the change in the IT infrastructure comprises moving one or more employees between:
particular workspaces of the enterprise;
work areas of the enterprise, each work area comprising a plurality of workspaces; or
buildings of the enterprise.

9. The system of claim 1, wherein the modeling phase comprises modeling a change to the IT infrastructure of the enterprise according to one or more of:
network topology considerations; and
one or more business rules associated with the enterprise.

10. The system of claim 1, wherein the process is for approving, managing, designing, and deploying change requests for changes in the IT infrastructure and for collaborating and validating progress of change requests, wherein:
the change request comprises one or more of a request for a change in the IT infrastructure or a request to resolve a problem associated with the IT infrastructure; and
the incident enables the change request to be tracked and monitored.

11. The system of claim 1, wherein the process further comprises a scheduling procedure for scheduling deployment of the IT infrastructure assets for fulfilling the change request, the scheduling procedure comprising creating one or more milestones for delivery of the IT infrastructure assets for fulfilling the change request.

12. The system of claim 11, wherein the CLAM tool is further operable to if a particular milestone is not met, notify one or more appropriate individuals that the particular milestone was not met.

13. The system of claim 1, further comprising a database operable to store the IT infrastructure information regarding the IT infrastructure of the enterprise.

14. The system of claim 1, wherein the CLAM tool is further operable to, in a modeling phase:
model the acceptability of validation considerations of the enterprise in the first proposed environment of each of the first employees assigned the first role; and
model the acceptability of validation considerations of the enterprise in the second proposed environment of each of the second employees assigned the second role.

15. A server system configured to manage information technology (IT) infrastructure of an enterprise, the server system comprising:
at least one electronic computing device configured to execute a centralized logistics and management (CLAM) tool operable to:
in a capture phase:
capture and store IT infrastructure information regarding the IT infrastructure of the enterprise;
define a plurality of roles within the enterprise, each role specifying a particular job function within the enterprise;
assign first items of IT infrastructure to a first role within the enterprise and assign second items of IT infrastructure to a second role within the enterprise, wherein the second items include one or more items of IT infrastructure not included in the first items; and
assign the first role to first employees of the enterprise, which assigns the first items of IT infrastructure to the first employees of the enterprise, and assign the second role to second employees of the enterprise, which assigns the second items of IT infrastructure to the second employees of the enterprise, wherein the second employees include one or more employees of the enterprise not included in the first employees;
in a modeling phase:
model the acceptability of a first proposed environment of each of the first employees assigned the first role, the first proposed environment including the first items of IT infrastructure assigned to the first role; and
model the acceptability of a second proposed environment of each of the second employees assigned the second role, the second proposed environment including the second items of IT infrastructure assigned to the second role; and
in a deployment phase, automatically initiate deployment of the modeled change in the first items of IT infrastructure assigned to the first employees of the enterprise, which includes organizing delivery of the modeled change in the first items of IT infrastructure to implement the modeled change in the first items of IT infrastructure, and automatically initiate deployment of the modeled change in the second items of IT infrastructure assigned to the second employees of the enterprise, which includes organizing delivery of the modeled change in the second items of IT infrastructure to implement the modeled change in the second items of IT infrastructure, wherein the deployment phase comprises user acceptance testing to determine whether one or more deployed changes in the IT infrastructure of the enterprise was correct for a particular employee to whom the one or more deployed changes were deployed.

16. A non-transitory computer readable medium storing instructions for controlling a server computer system to perform a method for managing information technology (IT) infrastructure of an enterprise, comprising:
    capturing and storing IT infrastructure information regarding the IT infrastructure of the enterprise;
    defining a plurality of roles within the enterprise, each role specifying a particular job function within the enterprise;
    assigning first items of IT infrastructure to a first role within the enterprise and assigning second items of IT infrastructure to a second role within the enterprise, wherein the second items include one or more items of IT infrastructure not included in the first items;
    assigning the first role to first employees of the enterprise, which assigns the first items of IT infrastructure to the first employees of the enterprise, and assigning the second role to second employees of the enterprise, which assigns the second items of IT infrastructure to the second employees of the enterprise, wherein the second employees include one or more employees of the enterprise not included in the first employees;
    modeling the acceptability of topology considerations of the enterprise in a first proposed environment of each of the first employees assigned the first role, the first proposed environment including the first items of IT infrastructure assigned to the first role;
    modeling the acceptability of topology considerations of the enterprise in a second proposed environment of each of the second employees assigned the second role, the second proposed environment including the second items of IT infrastructure assigned to the second role;
    automatically initiating deployment of the modeled change in the first items of IT infrastructure assigned to the first employees of the enterprise, comprising:
        organizing delivery of the modeled change in the first items of IT infrastructure to implement the modeled change in the first items of IT infrastructure;
    automatically initiating deployment of the modeled change in the second items of IT infrastructure assigned to the second employees of the enterprise, comprising:
        organizing delivery of the modeled change in the second items of IT infrastructure to implement the modeled change in the second items of IT infrastructure;
    receiving a change request;
    creating an incident for the change request;
    determining whether to approve the change request and if the change request is approved applying one or more business rules to the change request and initiating deployment of IT infrastructure assets for fulfilling the change request; and
    performing one or more follow-up procedures for determining whether the IT infrastructure assets for fulfilling the change request were properly deployed and, if the IT infrastructure assets were not properly deployed, creating a new incident for resolving problems associated with the deployment of the IT infrastructure assets.

17. The non-transitory computer readable medium of claim 16, wherein the IT infrastructure of the enterprise comprises one or more computer-related facilities, services, and installations used for operations of the enterprise, comprising one or more of:
    computer hardware; and
    computer software.

18. The non-transitory computer readable medium of claim 16, comprising capturing in an existing IT assets area an existing view of IT infrastructure assets of the enterprise, the existing IT assets area comprising one or more of:
    asset profiles for IT infrastructure assets of the enterprise;
    employee profiles for employees of the enterprise;
    location profiles for locations associated with the enterprise; and
    division profiles for divisions of the enterprise.

19. The non-transitory computer readable medium of claim 16, further comprising, if a role assigned to a particular employee is changed to a different role, changing the items of IT infrastructure associated with the particular employee to reflect the different role.

20. The non-transitory computer readable medium of claim 16, further comprising, for a particular employee who is assigned one or more roles, assigning one or more additional items of IT infrastructure to the particular employee such that the particular employee receives the one or more additional items of IT infrastructure.

21. The non-transitory computer readable medium of claim 16, comprising modeling a change in the IT infrastructure and automatically initiating deployment of the change in the IT infrastructure, wherein the change in the IT infrastructure comprises a technology refresh for one of:
    a particular employee of the enterprise;
    a particular group of employees of the enterprise;
    all employees of a division of the enterprise; and
    all employees of the enterprise.

22. The non-transitory computer readable medium of claim 16, comprising modeling a change in the IT infrastructure and automatically initiating deployment of the change in the IT infrastructure, wherein the change in the IT infrastructure comprises a technology refresh for one or more of:
    a particular workspace of the enterprise;
    a work area comprising a plurality of workspaces;
    a building of the enterprise; and
    all sites associated of the enterprise.

23. The non-transitory computer readable medium of claim 16, comprising modeling a change in the IT infrastructure and automatically initiating deployment of the change in the IT infrastructure, wherein the change in the IT infrastructure comprises moving one or more employees between:
    particular workspaces of the enterprise;
    work areas of the enterprise, each work area comprising a plurality of workspaces; or
    buildings of the enterprise.

24. The non-transitory computer readable medium of claim 16, comprising modeling a change to the IT infrastructure of the enterprise according to one or more of:
    network topology considerations; and
    one or more business rules associated with the enterprise.

25. The non-transitory computer readable medium of claim 16, further comprising conducting user acceptance testing to determine whether one or more deployed changes in the IT infrastructure of the enterprise was successful and, if the changes were not successful, initiating a process to correct problems.

26. The non-transitory computer readable medium of claim 16, wherein:
receiving a change request comprises receiving one or more of a request for a change in the IT infrastructure or a request to resolve a problem associated with the IT infrastructure; and
creating an incident for the change request comprises enabling the change request to be tracked and monitored.

27. The non-transitory computer readable medium of claim 16, further comprising:
scheduling deployment of the IT infrastructure assets for fulfilling the change request, and
creating one or more milestones for delivery of the IT infrastructure assets for fulfilling the change request.

28. The non-transitory computer readable medium of claim 27, further comprising if a particular milestone is not met, notifying one or more appropriate individuals that the particular milestone was not met.

29. The non-transitory computer readable medium of claim 16, comprising:
modeling the acceptability of validation considerations of the enterprise in the first proposed environment of each of the first employees assigned the first role; and
modeling the acceptability of validation considerations of the enterprise in the second proposed environment of each of the second employees assigned the second role.

* * * * *